US012589502B2

(12) United States Patent
Ushiyama et al.

(10) Patent No.: US 12,589,502 B2
(45) Date of Patent: Mar. 31, 2026

(54) CARGO-HANDLING APPARATUS, CONTROL DEVICE, CONTROL METHOD, AND STORAGE MEDIUM

(71) Applicant: Kabushiki Kaisha Toshiba, Kawasaki (JP)

(72) Inventors: Takafumi Ushiyama, Sagamihara (JP); Atsushi Sugahara, Kawasaki (JP); Hideichi Nakamoto, Setagaya (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 252 days.

(21) Appl. No.: 17/931,961

(22) Filed: Sep. 14, 2022

(65) Prior Publication Data

US 2023/0102238 A1     Mar. 30, 2023

(30) Foreign Application Priority Data

Sep. 22, 2021     (JP) ................................. 2021-154439

(51) Int. Cl.
*B25J 9/16* (2006.01)
*B25J 13/08* (2006.01)
(52) U.S. Cl.
CPC ........... *B25J 9/1697* (2013.01); *B25J 9/1651* (2013.01); *B25J 9/1664* (2013.01); *B25J 13/088* (2013.01)
(58) Field of Classification Search
CPC ...... B25J 9/1697; B25J 9/1651; B25J 9/1664; B25J 13/088; B65G 2203/041; B65G 47/917; B65G 47/91
See application file for complete search history.

(56) References Cited

U.S. PATENT DOCUMENTS 2,017 A * 3/1841 Chelrry .................... E02F 3/20
                                              37/94
9,498,887 B1* 11/2016 Zevenbergen ....... B25J 15/0052
(Continued)

FOREIGN PATENT DOCUMENTS

JP        10-120187        5/1998
JP        3672731 B2       7/2005
(Continued)

OTHER PUBLICATIONS

Japanese Office Action issued Aug. 1, 2024 in Japanese Application 2021-154439, (with English translation), 9 pages.
(Continued)

*Primary Examiner* — Sihar A Karwan
(74) *Attorney, Agent, or Firm* — Oblon, McClelland, Maier & Neustadt, L.L.P.

(57) ABSTRACT

According to one embodiment, a cargo-handling apparatus includes a holding unit, an image-capturing unit, a distance measurement sensor, and a control unit. The holding unit holds an article. The image-capturing unit captures an image of the article in a first direction. The distance measurement sensor measures a distance to the article in a second direction crossing the first direction. The control unit controls the holding unit. The control unit selects a first article to be held based on an imaging result by the image-capturing unit, calculates, based on a measurement result by the distance measurement sensor, a position of a first face of the first article and a position of a second face of the first article, and causes the holding unit to operate in accordance with the calculated position of the first face and the calculated position of the second face to hold the first article.

22 Claims, 17 Drawing Sheets

(56) References Cited

U.S. PATENT DOCUMENTS

| | | | | | |
|---|---|---|---|---|---|
| 2002/0092728 | A1* | 7/2002 | Tanaka | .................. | B65G 1/137 |
| | | | | | 198/315 |
| 2015/0344225 | A1* | 12/2015 | Nakamura | ........... | B65G 47/912 |
| | | | | | 414/277 |
| 2016/0207195 | A1* | 7/2016 | Eto | ...................... | B25J 15/0616 |
| 2017/0137236 | A1* | 5/2017 | Sonoura | ................ | B65G 61/00 |
| 2017/0173796 | A1* | 6/2017 | Kim | ...................... | B25J 9/1612 |
| 2018/0215540 | A1* | 8/2018 | Tanaka | .................. | B25J 13/086 |
| 2021/0269262 | A1* | 9/2021 | Mori | ...................... | B25J 9/1612 |

FOREIGN PATENT DOCUMENTS

| | | | |
|---|---|---|---|
| JP | 2006-159346 | | 6/2006 |
| JP | 2018-47544 | A | 3/2018 |
| JP | 2018-122945 | A | 8/2018 |
| JP | 2019-43772 | A | 3/2019 |
| JP | 2019-217570 | A | 12/2019 |
| JP | 2019-218155 | A | 12/2019 |
| JP | 2020-147427 | A | 9/2020 |
| WO | WO 2017/094110 | A1 | 6/2017 |
| WO | WO 2019/240272 | A1 | 12/2019 |

OTHER PUBLICATIONS

Office Action mailed Jan. 24, 2025 in Chinese Application No. 202211119561.4 filed Sep. 14, 2022 (w/English translation).

* cited by examiner

12/17

CARGO-HANDLING APPARATUS, CONTROL DEVICE, CONTROL METHOD, AND STORAGE MEDIUM

CROSS-REFERENCE TO RELATED APPLICATIONS

This application is based upon and claims the benefit of priority from Japanese Patent Application No. 2021-154439, filed on Sep. 22, 2021; the entire contents of which are incorporated herein by reference.

FIELD

Embodiments described herein relate generally to a cargo-handling apparatus, a control device, a control method, and a storage medium.

BACKGROUND

There is a cargo-handling apparatus that holds and transports an article. Improvement in transport efficiency is required for the technology.

DETAILED DESCRIPTION

Figure 1:
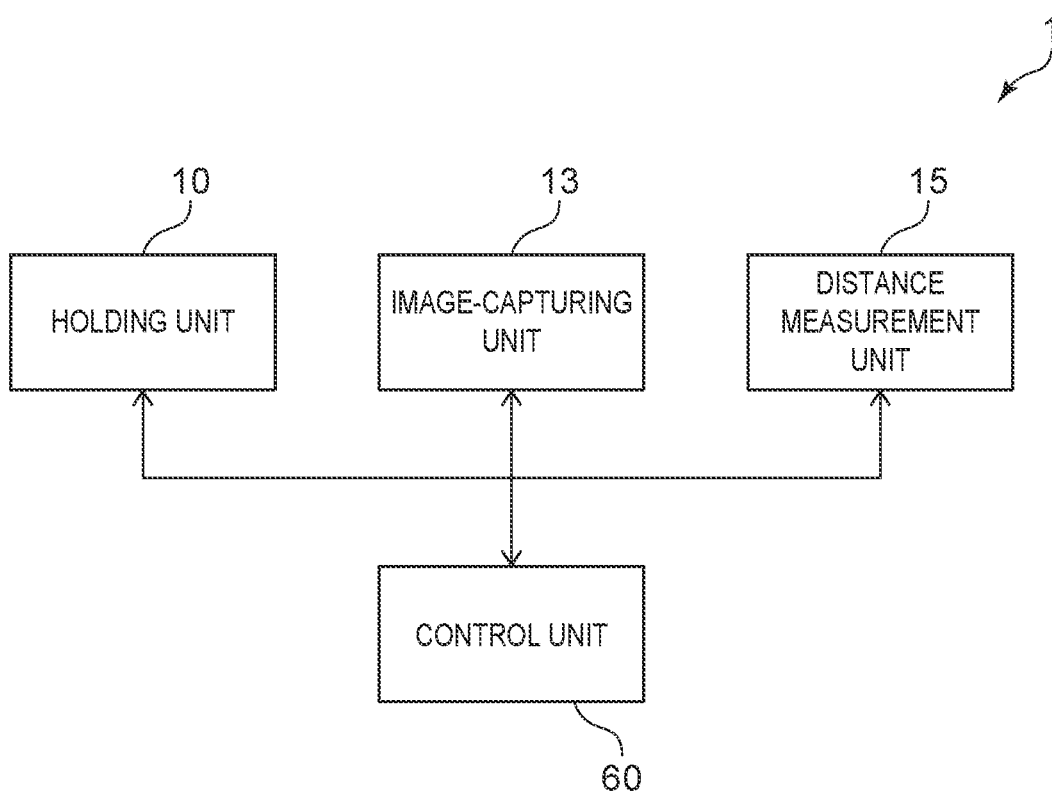
FIG. 1 is a schematic view showing a schematic configuration of a cargo-handling apparatus according to an embodiment.

According to one embodiment, a cargo-handling apparatus includes a holding unit, an image-capturing unit, a distance measurement sensor, and a control unit. The holding unit is configured to hold an article. The image-capturing unit is configured to capture an image of the article in a first direction. The distance measurement sensor is configured to measure a distance to the article in a second direction crossing the first direction. The control unit is configured to control the holding unit. The control unit is configured to select a first article to be held based on an imaging result by the image-capturing unit. The control unit is configured to calculate, based on a measurement result by the distance measurement sensor, a position of a first face of the first article crossing the first direction and a position of a second face of the first article crossing the second direction. The control unit is configured to cause the holding unit to operate in accordance with the calculated position of the first face and the calculated position of the second face to hold the first article.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a schematic configuration of a cargo-handling apparatus according to an embodiment.

As shown in FIG. 1, a cargo-handling apparatus 1 according to the embodiment includes a holding unit 10, an image-capturing unit 13, a distance measurement sensor 15, and a control unit 60.

The holding unit 10 holds (stably grasps) an article. A holding method is, for example, suction. The holding unit 10 may hold the article by pinching or jamming.

The image-capturing unit 13 captures an image of the article in a first direction and acquires the image. The image-capturing unit 13 includes at least one selected from an image sensor and a distance image sensor.

The distance measurement sensor 15 measures a distance to the article in a second direction crossing the first direction. The distance measurement sensor 15 emits infrared rays, laser light, or ultrasonic waves toward the article. From a viewpoint of distance measurement accuracy, the distance measurement sensor 15 is favorably a laser range finder (LRF) using laser light.

The control unit 60 controls the holding unit 10, the image-capturing unit 13, and the distance measurement sensor 15. The control unit 60 recognizes the article based on the image acquired by the image-capturing unit 13. The control unit 60 selects an article to be held from recognized articles. The article has a first face crossing the first direction and a second face crossing the second direction. The control unit 60 calculates a position of the first face and a position of the second face of the article based on a measurement result by the distance measurement sensor 15. The control unit 60 operates the holding unit 10 in accordance with the calculated position of the first face and the calculated position of the second face, and holds the article by the holding unit 10. For example, the holding unit 10 holds the first face of the article. The holding unit 10 may further hold the second face in addition to the first face.

Figure 2:
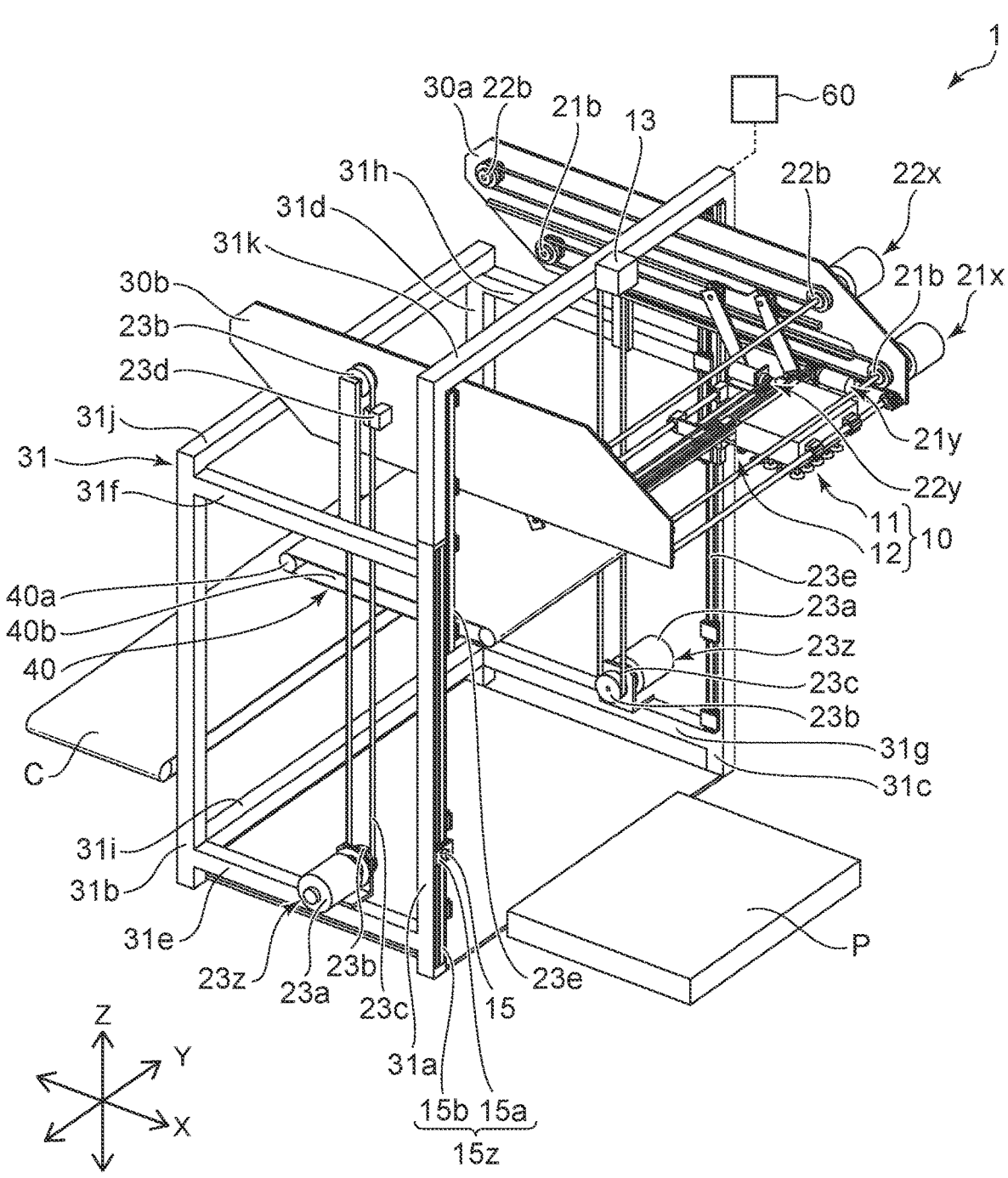
FIG. 2 is a perspective view illustrating a specific configuration of a cargo-handling apparatus according to the embodiment.

FIG. 2 is a perspective view illustrating a specific configuration of a cargo-handling apparatus according to the embodiment.

For example, as shown in FIG. 2, the cargo-handling apparatus 1 includes the holding unit 10, the image-capturing unit 13, the distance measurement sensor 15, driving units 21x, 21y, 22x, 22y, and 23z, base plates 30a and 30b, a frame 31, a lift 40, and the control unit 60.

In the example of FIG. 2, the holding unit 10 holds an article by suction. The holding unit 10 includes a first holding unit 11 and a second holding unit 12. The first holding unit 11 is capable of holding a first face of the article. The second holding unit 12 is capable of holding a second face of the article. By using both the first holding unit 11 and the second holding unit 12, it is possible to more stably hold the article. Alternatively, by using only the first holding unit 11, it is possible to selectively hold only a target article even when there is another article in front of the article to be held.

Here, for the sake of description, an X-direction (front-rear direction), a Y-direction (left-right direction), and a Z-direction (up-down direction) are used. The Z-direction is parallel to the first direction. The X-direction is parallel to the second direction. The Y-direction crosses a plane parallel to the X-direction and the Z-direction. For example, the X-direction and the Y-direction are parallel to a horizontal plane. The Z-direction is parallel to a vertical direction. The X-direction, the Y-direction, and the Z-direction are orthogonal to one another.

Figure 3:
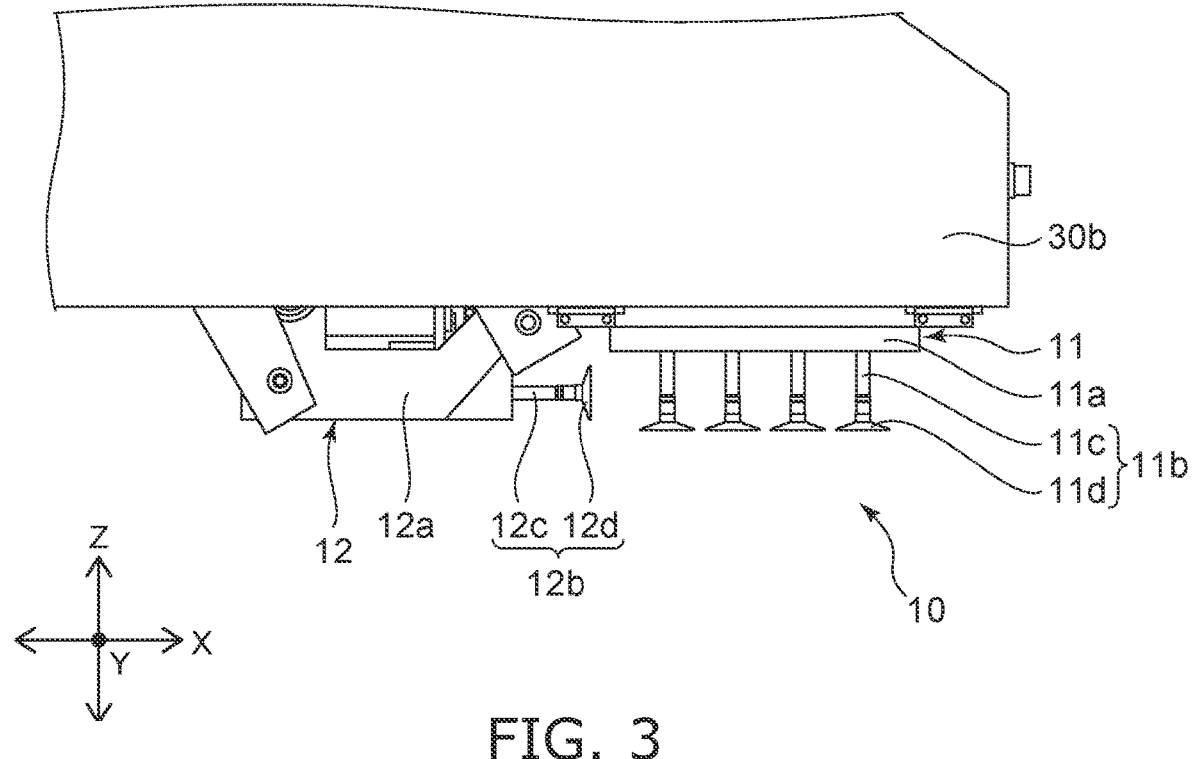
FIG. 3 is a side view showing a part of the cargo-handling apparatus according to an embodiment.

FIG. 3 is a side view showing a part of the cargo-handling apparatus according to an embodiment.

As shown in FIG. 3, the first holding unit 11 includes a housing 11a and a suction unit 11b attached to the housing 11a. The housing 11a includes a pipe, a valve, and the like necessary for vacuum suction. The suction unit 11b includes a rod 11c and a suction pad 11d. The rod 11c extends in the Z-direction. The suction pad 11d is provided at a tip end of the rod 11c, and includes a negative pressure sensor (not shown). A suction face at a tip end of the suction pad 11d faces downward.

Similarly to the first holding unit 11, the second holding unit 12 includes a housing 12a and a suction unit 12b attached to the housing 12a. The housing 12a includes a pipe, a valve, and the like necessary for vacuum suction. The suction unit 12b includes a rod 12c and a suction pad 12d. When the second holding unit 12 holds an article, the rod 12c extends in the X-direction. The suction pad 12d is provided at a tip end of the rod 12c, and includes a negative pressure sensor (not shown). When the second holding unit 12 holds an article, a suction face at a tip end of the suction pad 12d faces forward.

Internal spaces of the suction units 11b and 12b are connected to an exhaust system (not shown) such as an exhaust device provided outside the first holding unit 11 and the second holding unit 12 via pipes and valves provided inside the housings 11a and 12a, respectively. The internal space of the suction unit 11b can be exhausted independently of the internal space of the suction unit 12b.

Multiple suction units 11b and 12b may be provided. In the example of FIG. 2 and FIG. 3, the first holding unit 11 includes multiple suction units 11b arranged in two directions orthogonal to each other. The second holding unit 12 includes multiple suction units 12b arranged in one direction.

Figure 4:
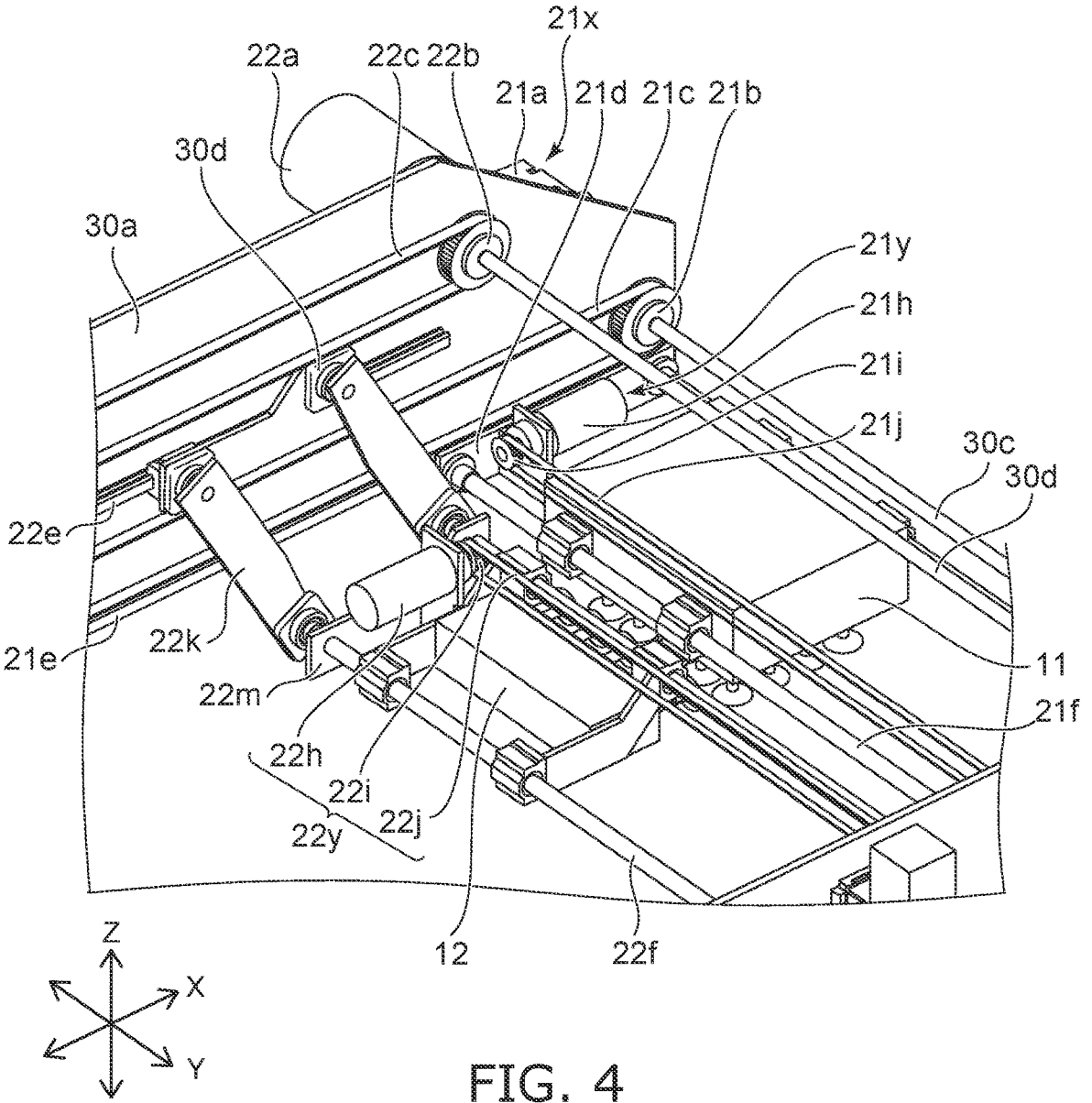
FIG. 4 is a perspective view showing a part of the cargo-handling apparatus according to the embodiment.

FIG. 4 is a perspective view showing a part of the cargo-handling apparatus according to the embodiment.

The driving unit 21x moves the first holding unit 11 in the X-direction. The driving unit 21y moves the first holding unit 11 in the Y-direction.

For example, as shown in FIG. 4, the driving unit 21x includes an actuator 21a, pulleys 21b, a belt 21c, a bar 21d, and a guide 21e. In the example, the actuator 21a is a motor. A rotation shaft of the actuator 21a is parallel to the Y-direction. The rotation shaft of the actuator 21a is coupled to the pulley 21b. The other pulley 21b is provided at a position separated from the pulley 21b in the X-direction. The belt 21c is wound around the pair of pulleys 21b. The bar 21d is fixed to the belt 21c. The bar 21d is fitted to the guide 21e extending along the X-direction. When the pulleys 21b are rotated around the Y-direction by the actuator 21a, the belt 21c moves along the X-direction between the pair of pulleys 21b. The bar 21d fixed to the belt 21c moves in the X-direction along the guide 21e.

Rods 21f extend along the Y-direction and are fixed to the bar 21d. In the example, a pair of rods 21f separated from each other in the X-direction are provided. The first holding unit 11 is coupled to each of the rods 21f. In accordance with a movement of the bar 21d, the rods 21f and the first holding unit 11 move in the X-direction.

The driving unit 21y moves in the X-direction together with the bar 21d. The driving unit 21y includes an actuator 21h, pulleys 21i, and a belt 21j. The actuator 21h is a motor. A rotation shaft of the actuator 21h is coupled to the pulley 21i. The other pulley 21i is provided at a position separated from the pulley 21i in the Y-direction. The belt 21j is wound around the pair of pulleys 21i.

The first holding unit 11 is coupled to the rods 21f so as to be slidable in the Y-direction. The first holding unit 11 is fixed to the belt 21j. When the pulleys 21i are rotated by the actuator 21h, the belt 21j moves along the Y-direction between the pair of pulleys 21i. The first holding unit 11 fixed to the belt 21j moves in the Y-direction.

The driving unit 22x moves the second holding unit 12 in the X-direction. The driving unit 22y moves the second holding unit 12 in the Y-direction.

For example, as shown in FIG. 4, the driving unit 22x includes an actuator 22a, pulleys 22b, a belt 22c, a bar 22d, and a guide 22e. In the example, the actuator 22a is a motor. A rotation shaft of the actuator 22a is parallel to the Y-direction. The rotation shaft of the actuator 22a is coupled to the pulley 22b. The other pulley 22b is provided at a position separated from the pulley 22b in the X-direction. The belt 22c is wound around the pair of pulleys 22b. The bar 22d is fixed to the belt 22c. The bar 22d is fitted to the guide 22e extending along the X-direction. When the pulleys 22b are rotated around the Y-direction by the actuator 22a, the belt 22c moves along the X-direction between the pair of pulleys 22b. The bar 22d fixed to the belt 22c moves in the X-direction along the guide 22e.

A bar 22m is coupled to the bar 22d via links 22k. Rods 22f extend along the Y-direction and are fixed to the bar 22m. In the example, a pair of rods 22f separated from each other in the X-direction are fixed to the bar 22m. A pair of links 22k separated from each other in the X-direction are coupled to the bar 22m. In accordance with a movement of the bar 21$d$, the links 22$k$, the bar 22$m$, the rods 22$f$, and the second holding unit 12 move in the X-direction.

The driving unit 22$y$ moves in the X-direction together with the bar 22$d$. The driving unit 22$y$ includes an actuator 22$h$, pulleys 22$i$, and a belt 22$j$. The actuator 22$h$ is a motor. A rotation shaft of the actuator 22$h$ is coupled to the pulley 22$i$. The other pulley 22$i$ is provided at a position separated from the pulley 22$i$ in the Y-direction. The belt 22$j$ is wound around the pair of pulleys 22$i$. The rotation shaft of the actuator 22$h$ is parallel to the X-direction, and is coupled to any one of the pulleys 22$i$.

The second holding unit 12 is coupled to the rods 22$f$ so as to be movable in the Y-direction. The second holding unit 12 is fixed to the belt 22$j$. When the pulleys 22$i$ are rotated by the actuator 22$h$, the belt 22$j$ moves along the Y-direction between the pair of pulleys 22$i$. The second holding unit 12 fixed to the belt 22$j$ moves in the Y-direction.

The base plates 30$a$ and 30$b$ are provided as support portions for supporting the first holding unit 11 and the second holding unit 12. As shown in FIG. 2, the base plates 30$a$ and 30$b$ are plate-shaped members extending along an X-Z plane, and are separated from each other in the Y-direction. The base plates 30$a$ and 30$b$ support the first holding unit 11 via the pulleys 21$b$, the belt 21$c$, the bar 21$d$, and the rods 21$f$. The base plates 30$a$ and 30$b$ support the second holding unit 12 via the pulleys 22$b$, the belt 22$c$, the bar 22$d$, the links 22$k$, the bar 22$m$, and the rods 22$f$.

The pulleys 21$b$, the belt 21$c$, the bar 21$d$, the guide 21$e$, the pulleys 22$b$, the belt 22$c$, the bar 22$d$, the guide 22$e$, the links 22$k$, and the bar 22$m$ are attached to the base plates 30$a$ and 30$b$, respectively, and are positioned between the base plates 30$a$ and 30$b$ when viewed from the Z-direction. The rods 21$f$ are fixed to the bar 21$d$ so as to face each other in the Y-direction. The rods 22$f$ are fixed to the bar 22$d$ so as to face each other in the Y-direction. The actuators 21$a$ and 22$a$ are attached to the base plate 30$a$. The actuators 21$a$ and 22$a$ may be attached to the base plate 30$b$ or both of the base plates 30$a$ and 30$b$.

The pulley 21$b$ in front of the base plate 30$a$ and the pulley 21$b$ in front of the base plate 30$b$ are coupled to each other by a rod 30$c$ extending in the Y-direction. A driving force of the actuator 21$a$ attached to the base plate 30$a$ is transmitted to the pulley 21$b$ on the base plate 30$b$ by the rod 30$c$. The pair of pulleys 21$b$ on the base plate 30$b$ rotate in synchronization with the pair of pulleys 21$b$ on the base plate 30$a$. Accordingly, the bar 21$d$ on the base plate 30$b$ moves in the X-direction in synchronization with the bar 21$d$ on the base plate 30$a$.

The pulley 22$b$ in front of the base plate 30$a$ and the pulley 22$b$ in front of the base plate 30$b$ are coupled to each other by a rod 30$d$ extending in the Y-direction. A driving force of the actuator 22$a$ attached to the base plate 30$a$ is transmitted to the pulley 22$b$ on the base plate 30$b$ by the rod 30$d$. The pair of pulleys 22$b$ on the base plate 30$b$ rotate in synchronization with the pair of pulleys 22$b$ on the base plate 30$a$. Accordingly, the bar 22$m$ on the base plate 30$b$ moves in the X-direction in synchronization with the bar 22$m$ on the base plate 30$a$.

Since the rods 21$f$ and 22$f$ and the rods 30$c$ and 30$d$ are bridged between the base plates 30$a$ and 30$b$, the first holding unit 11 and the second holding unit 12 can be supported more stably. For example, positions of the first holding unit 11 and the second holding unit 12 in the Z-direction can be further stabilized.

As shown in FIG. 2, multiple driving units 23$z$ are provided in the Y-direction. The pair of driving units 23$z$ move the base plates 30$a$ and 30$b$ in the Z-direction. By an operation of the driving units 23$z$, the first holding unit 11 and the second holding unit 12 are moved in the Z-direction.

For example, each driving unit 23$z$ includes an actuator 23$a$, a pair of pulleys 23$b$, a belt 23$c$, a block 23$d$, and a guide 23$e$. The actuator 23$a$ is a motor. A rotation shaft of the actuator 23$a$ is parallel to the Y-direction. The rotation shaft of the actuator 23$a$ is coupled to one of the pulleys 23$b$. The pair of pulleys 23$b$ are separated from each other in the Z-direction. The belt 23$c$ is wound around the pair of pulleys 23$b$.

The block 23$d$ is fixed to each of a side surface of the base plate 30$a$ and a side surface of the base plate 30$b$. The block 23$d$ is fixed to the belt 23$c$. Each of the base plates 30$a$ and 30$b$ is fitted to the guide 23$e$. By rotation of the actuator 23$a$, the pulleys 23$b$ are rotated around the Y-direction, and the belt 23$c$ moves along the Z-direction between the pair of pulleys 23$b$. Accordingly, the base plates 30$a$ and 30$b$ fixed to the belt 23$c$ move in the Z-direction.

The driving units 23$z$ are attached to the frame 31. The first holding unit 11 and the second holding unit 12 are movable in the X-direction, the Y-direction, and the Z-direction with respect to the frame 31 by the driving units 21$x$, 21$y$, 22$x$, 22$y$, and 23$z$.

The distance measurement sensor 15 is attached to the frame 31 via a driving unit 15$z$. The driving unit 15$z$ includes an actuator 15$a$ and a guide 15$b$. The guide 15$b$ extends along the Z-direction. The actuator 15$a$ moves the distance measurement sensor 15 in the Z-direction along the guide 15$b$. The distance measurement sensor 15 measures a distance to an article positioned obliquely ahead.

The image-capturing unit 13 is positioned above a pallet P and is fixed to the frame 31 via a fixing tool (not shown). The image-capturing unit 13 captures an image of articles stacked on the pallet P and acquires the image.

For example, the frame 31 includes vertical frames 31$a$ to 31$d$ and horizontal frames 31$e$ to 31$k$. The vertical frames 31$a$ and 31$b$ are separated from each other in the X-direction. The vertical frames 31$c$ and 31$d$ are separated from each other in the X-direction. The vertical frames 31$a$ and 31$b$ are opposed to the vertical frames 31$c$ and 31$d$ in the Y-direction. The horizontal frames 31$e$ and 31$f$ couple lower ends and upper ends of the vertical frames 31$a$ and 31$b$ to each other. The horizontal frames 31$g$ and 31$h$ couple lower ends and upper ends of the vertical frames 31$c$ and 31$d$ to each other. The horizontal frames 31$i$ and 31$j$ couple lower ends and upper ends of the vertical frames 31$b$ and 31$d$. The horizontal frame 31$k$ couples upper ends of the vertical frames 31$a$ and 31$c$. The guide 15$b$ is attached to the vertical frame 31$a$. The guide 23$e$ is attached to each of the vertical frames 31$a$ and 31$c$.

The lift 40 is provided inside the frame 31. That is, when viewed in the Z-direction, the lift 40 is positioned in a rectangular region surrounded by the vertical frames 31$a$ to 31$d$. An upper surface of the lift 40 is parallel to the X-direction and the Y-direction. The lift 40 is moved in the Z-direction by a driving unit (not shown).

As shown in FIG. 2, the lift 40 includes a pair of rollers 40$a$ and a belt 40$b$. The pair of rollers 40$a$ are separated from each other in the X-direction. The belt 40$b$ is wound around the pair of rollers 40$a$. Rotation shafts of the rollers 40$a$ are parallel to the Y-direction. When the rollers 40$a$ are rotated by a motor (not shown), the belt 40$b$ moves along the X-direction between the pair of rollers 40$a$.

A conveyor C is provided outside the frame 31. A driving unit of the lift 40 sets the lift 40 to a state in which the lift 40 is at a same height as the conveyor C, a state in which the lift 40 is at a position lower than the conveyor C, or a state in which the lift 40 is at a position higher than the conveyor C.

When the pallet P on which articles are stacked is placed in front of the cargo-handling apparatus 1, the cargo-handling apparatus 1 sequentially transports the articles to the lift 40. The lift 40 is set at the same height as the conveyor C. Thereafter, the articles placed on the lift 40 are transported onto the conveyor C. The lift 40 function as a transport unit configured to transport the article along the Z-direction or toward the conveyor C.

The control unit 60 is connected to and controls the driving units of the cargo-handling apparatus 1, the exhaust device, the image-capturing unit 13, and the distance measurement sensor 15. The control unit 60 processes data necessary for holding and transporting an article A. The control unit 60 includes a processing circuit including a central processing unit, a memory in which a program is stored, and the like.

Figures 5A, 5B:
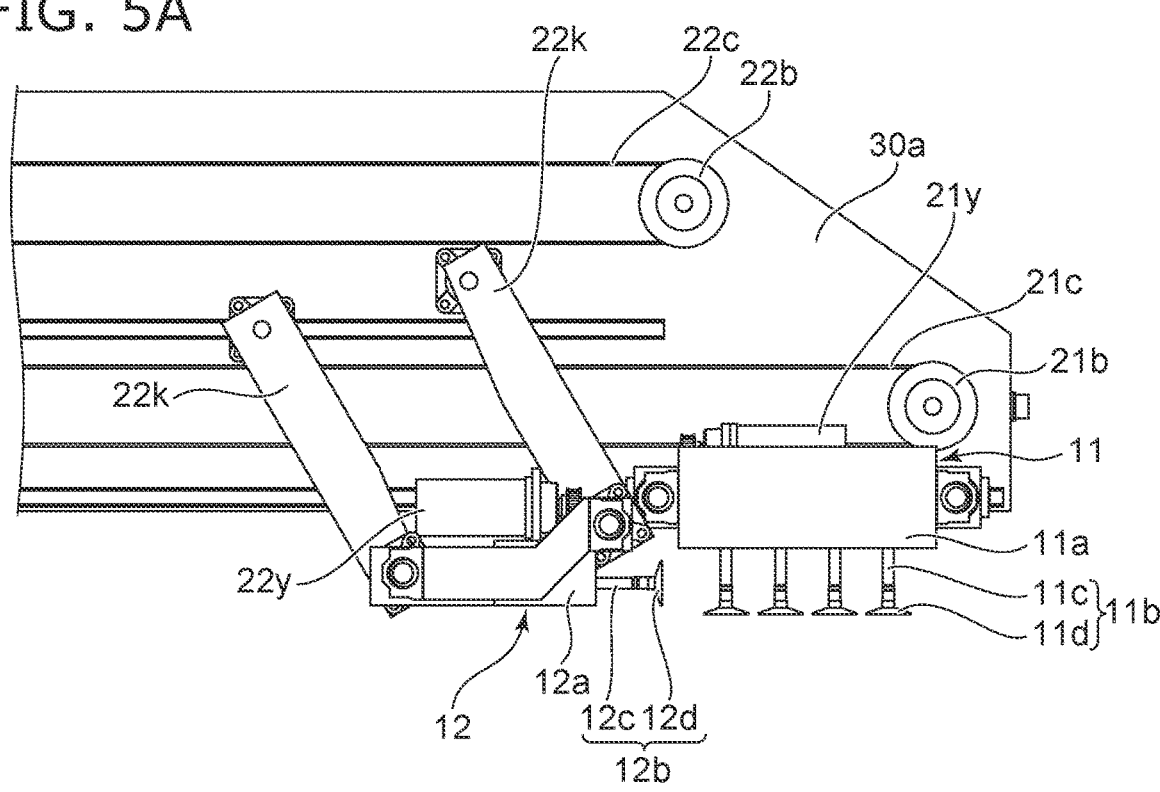
FIG. 5A and FIG. 5B are side views showing a part of the cargo-handling apparatus according to the embodiment.

FIG. 5A and FIG. 5B are side views showing a part of the cargo-handling apparatus according to the embodiment.

The control unit 60 can switch the position of the second holding unit 12 between a holding position and a retracted position. When the second holding unit 12 holds an article, the position of the second holding unit 12 is set to the holding position. When the second holding unit 12 does not hold an article, the position of the second holding unit 12 is set to the retracted position.

FIG. 5A shows a state in which the second holding unit 12 is at the holding position. FIG. 5B shows a state in which the second holding unit 12 is at the retracted position. For example, when the driving unit 22$x$ moves the second holding unit 12 in the X-direction, the position of the second holding unit 12 is switched between the holding position and the retracted position. A distance between the first holding unit 11 and the second holding unit 12 when the second holding unit 12 is at the retracted position shown in FIG. 5B is longer than a distance between the first holding unit 11 and the second holding unit 12 when the second holding unit 12 is at the holding position shown in FIG. 5A.

The cargo-handling apparatus 1 executes a first operation when transporting articles in a first arrangement. In the first operation, the position of the second holding unit 12 is set to the retracted position. The cargo-handling apparatus 1 executes a second operation when transporting articles in a second arrangement. In the second operation, the position of the second holding unit 12 is set to the holding position. In the first arrangement, articles having different sizes are arranged in the X-direction and the Y-direction and stacked in the Z-direction. In the second arrangement, articles having substantially the same size are arranged in the X-direction and the Y-direction and stacked in the Z-direction.

Data indicating an arrangement of the article A on the pallet P may be input by a user or may be transmitted to the control unit 60 by a communication method. For example, the control unit 60 receives data indicating the arrangement. The control unit 60 switches the position of the second holding unit 12 based on the received data.

FIG. 6A, FIG. 6B, FIG. 7A, FIG. 7B, FIG. 8A, and FIG. 8B are schematic views showing the first operation of the cargo-handling apparatus according to the embodiment. FIG. 9A, FIG. 9B, FIG. 10A, FIG. 10B, FIG. 11A, and FIG. 11B are schematic views showing the second operation of the cargo-handling apparatus according to the embodiment.

When articles in the first arrangement are transported, the cargo-handling apparatus 1 sequentially transports the articles from an article whose upper surface is at a highest position. It is not necessary to use the second holding unit 12 for transporting the articles in the first arrangement. Therefore, in FIG. 6A to FIG. 8B, the second holding unit 12 is omitted.

Figure 6A:
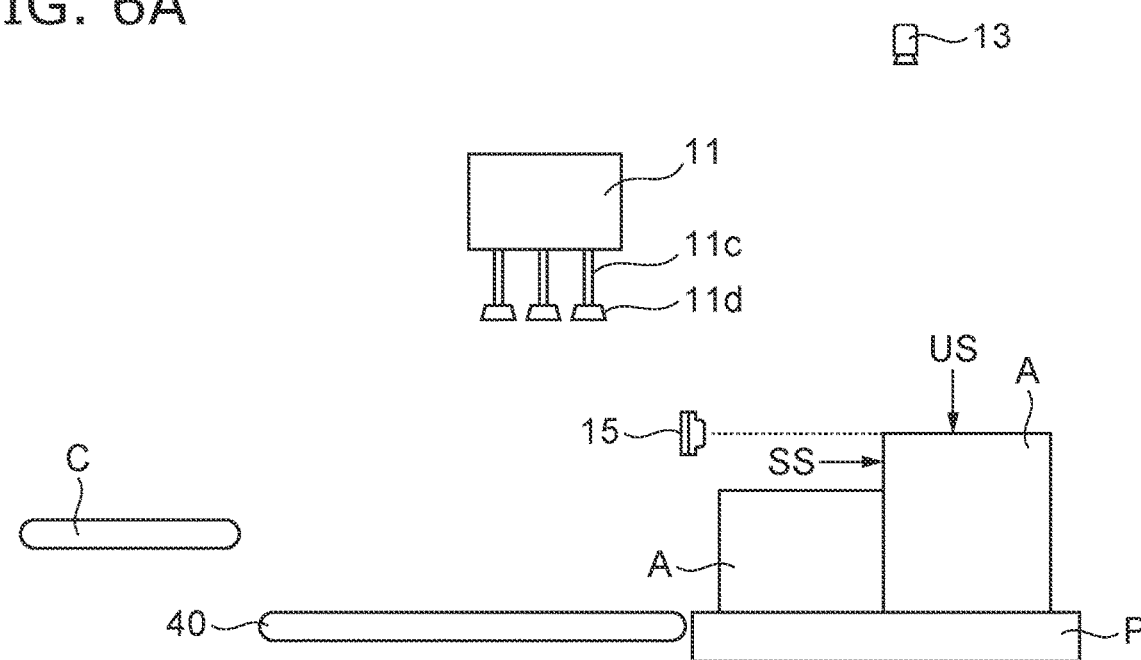
FIGS. 6A and 6B are schematic views showing the first operation of the cargo-handling apparatus according to the embodiment.

First, the image-capturing unit 13 captures an image of multiple articles A on the pallet P from above. The control unit 60 selects the article A (first article) whose upper surface is at the highest position from the image indicating an imaging result as an object to be held. The control unit 60 calculates a position of the upper surface of the selected article A based on the imaging result. As shown in FIG. 6A, the distance measurement sensor 15 measures a distance (first distance) to the selected article A. The control unit 60 calculates a position of an upper surface US and a position of a side surface SS of the article A based on a measurement result. The side surface SS is a face facing either the X-direction or the Y-direction. The side surface SS may be inclined with respect to the X-direction and the Y-direction.

For example, the driving unit 15$z$ positions the distance measurement sensor 15 slightly above the position of the upper surface US calculated from the imaging result. While the distance measurement sensor 15 repeats distance measurement, the driving unit 15$z$ lowers the distance measurement sensor 15. At the position of the upper surface US, a measured distance changes. Specifically, the measured distance is relatively long above the upper surface US. The measured distance is relatively short at a same height as the upper surface US and below the upper surface US. The control unit 60 acquires a position at which the measured distance is greatly changed as the position of the upper surface US. The control unit 60 calculates the position of the side surface SS based on the position of the distance measurement sensor 15 in an X-Y plane and the measured distance.

The control unit 60 determines the position of the first holding unit 11 in the X-Y plane based on the calculated position of the side surface SS, and moves the first holding unit 11 to the position. The control unit 60 lowers the first holding unit 11 to the calculated position of the upper surface US. For example, the control unit 60 lowers the first holding unit 11 at a first speed at a position away from the upper surface US. The control unit 60 lowers the first holding unit 11 at a second speed at a position close to the upper surface US. The second speed is slower than the first speed.

Figure 6B:
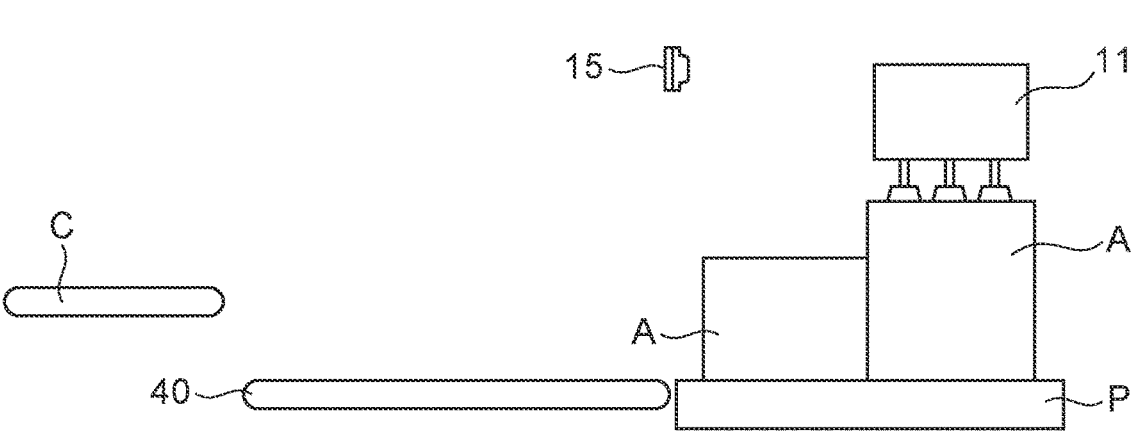

As shown in FIG. 6B, the control unit 60 presses the first holding unit 11 against the upper surface of the article A. The control unit 60 operates an exhaust system to make a pressure inside the suction units 11$b$ lower than an atmospheric pressure. Accordingly, the first holding unit 11 holds the upper surface of the article A. At this time, the distance measurement sensor 15 stands by at a position higher than the held article A.

Figure 7A:
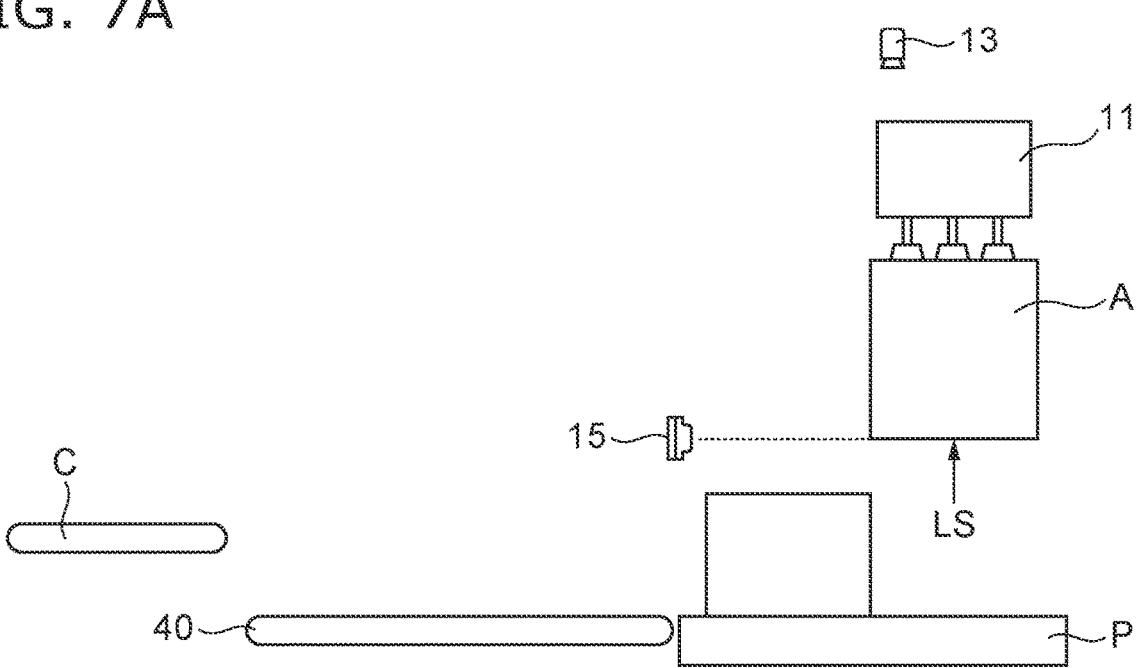
FIGS. 7A and 7B are schematic views showing the first operation of the cargo-handling apparatus according to the embodiment.

As shown in FIG. 7A, the control unit 60 raises the first holding unit 11. While the first holding unit 11 is raised, the distance measurement sensor 15 is lowered while repeating the distance measurement. For example, the distance measurement sensor 15 is lowered while repeating the distance measurement until a lower surface LS of the held article A is detected. The control unit 60 calculates a height (dimension in the Z-direction) of the article A based on a raising amount of the first holding unit 11 and a lowering amount of the distance measurement sensor 15 from the detection of the upper surface US to the detection of the lower surface LS.

Figure 7B:
Figure 7B:
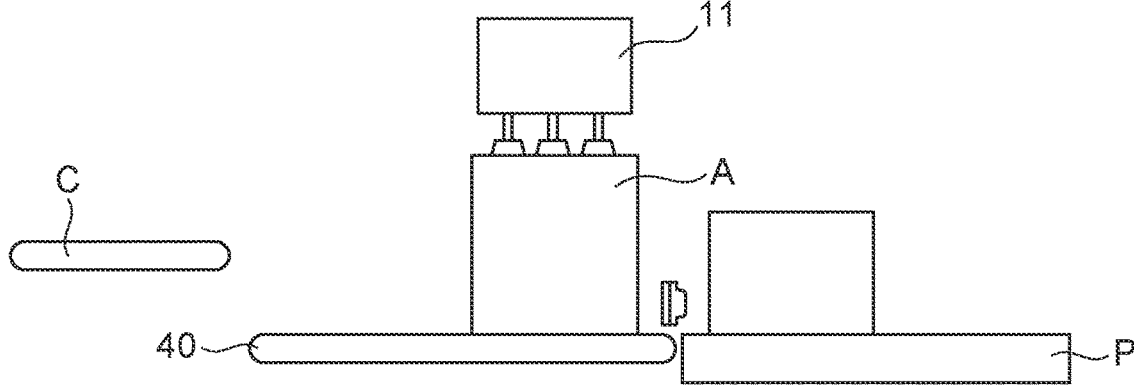

The control unit 60 moves the first holding unit 11 onto the lift 40. As shown in FIG. 7B, the control unit 60 lowers the first holding unit 11 toward the lift 40. A lowering amount of the first holding unit 11 is calculated based on a position of the lift 40, the calculated height of the article A, and the raising amount of the first holding unit 11 after holding. For example, the control unit 60 lowers the first holding unit 11 at a third speed at a position away from the lift 40. The control unit 60 lowers the first holding unit 11 at a fourth speed at a position close to the lift 40. The fourth speed is slower than the third speed.

Figure 8A:
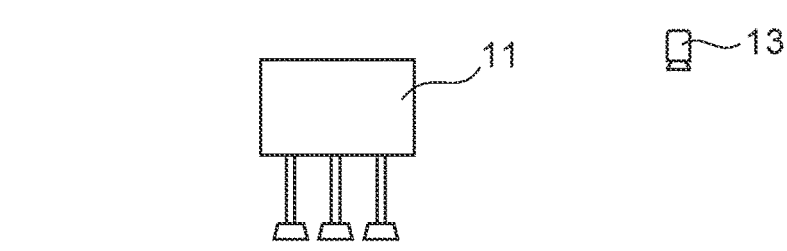
FIGS. 8A and 8B are schematic views showing the first operation of the cargo-handling apparatus according to the embodiment.
Figure 8A:
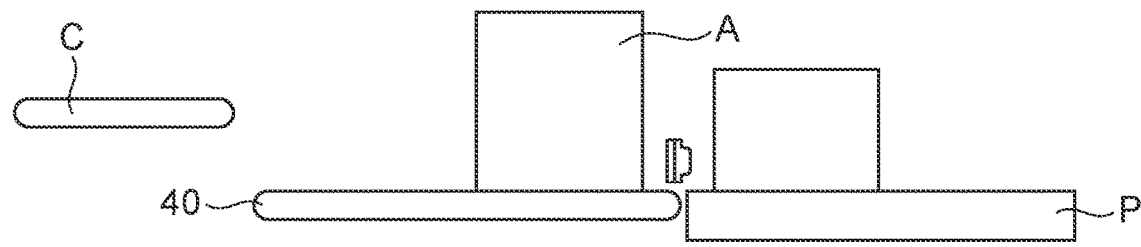

The control unit 60 increases the pressure inside the suction units 11b to weaken a suction force of the first holding unit 11. For example, the control unit 60 opens the inside of the suction units 11b to the atmosphere. Accordingly, the suction of the article A by the first holding unit 11 is released. The article A is placed on the lift 40. As shown in FIG. 8A, the control unit 60 raises the first holding unit 11 to separate the first holding unit 11 from the article A.

Figure 8B:
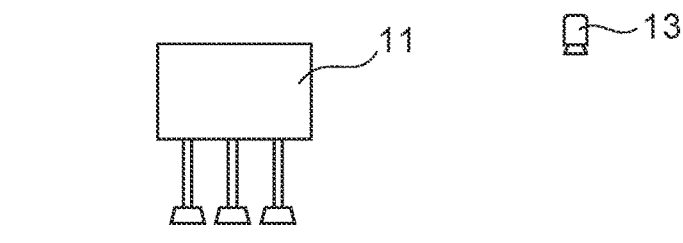
Figure 8B:
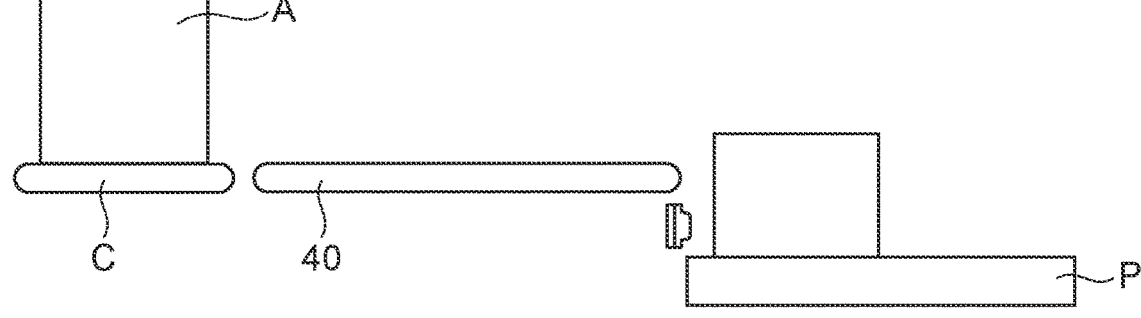

Thereafter, the article A is dispensed by the lift 40 and the conveyor C. Specifically, the control unit 60 positions an upper surface of the lift 40 at a same height as an upper surface of the conveyor C. As shown in FIG. 8B, the control unit 60 operates the lift 40 to transport the article A onto the conveyor C. The conveyor C transports the article A to another place. Until all the articles A placed on the pallet P are dispensed, the cargo-handling apparatus 1 repeats the first operation shown in FIG. 6A to FIG. 8B.

Figure 9A:
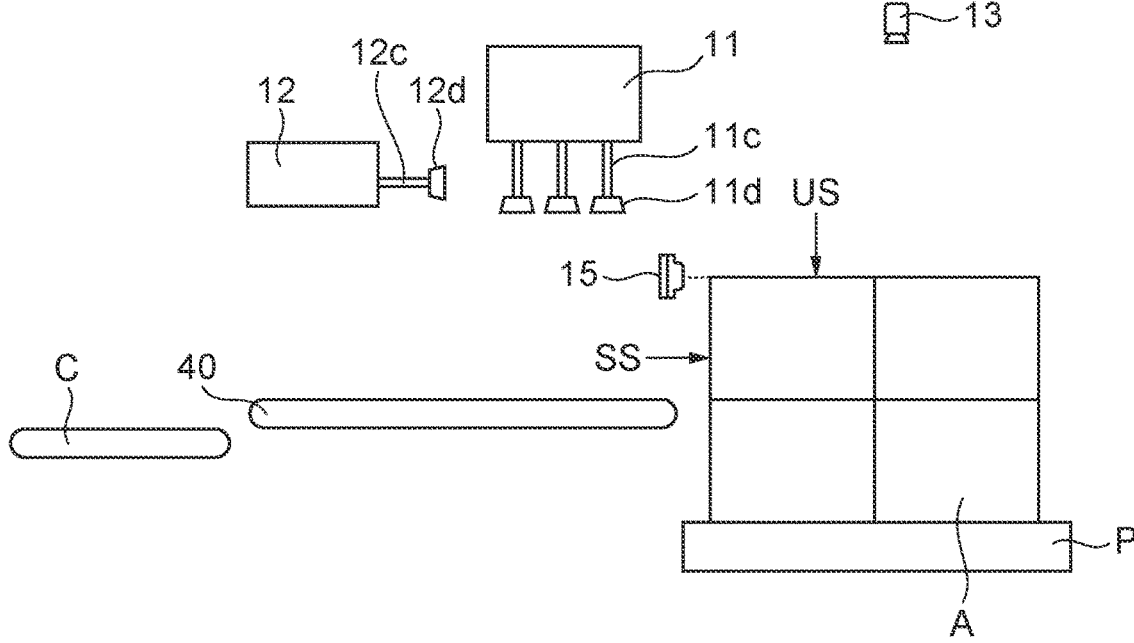
FIGS. 9A and 9B are schematic views showing the second operation of the cargo-handling apparatus according to the embodiment.

As shown in FIG. 9A, when articles in the second arrangement are transported, the control unit 60 positions the second holding unit 12 at the holding position. The control unit 60 positions the upper surface of the lift 40 at a same height as an upper surface of the article A to be transported. When the articles in the second arrangement are transported, the cargo-handling apparatus 1 sequentially transports the articles from an article whose upper surface is at the highest position and which is positioned on a front side.

First, the image-capturing unit 13 captures an image of multiple articles A on the pallet P from above. The control unit 60 selects, based on an imaging result, an article A whose upper surface is at the highest position and whose distance from the lift 40 in the X-direction is the shortest. The control unit 60 calculates a position of an upper surface of the selected article A based on the imaging result. The distance measurement sensor 15 measures a distance to the selected article A. The control unit 60 calculates a position of an upper surface US and a position of a side surface SS of the article A based on a measurement result.

The control unit 60 determines the position of the first holding unit 11 in the X-Y plane based on the calculated position of the side surface SS, and moves the first holding unit 11 to the position. The control unit 60 lowers the first holding unit 11 to the calculated position of the upper surface US. For example, the control unit 60 lowers the first holding unit 11 at a first speed at a position away from the upper surface US. The control unit 60 lowers the first holding unit 11 at a second speed at a position close to the upper surface US.

Figure 9B:
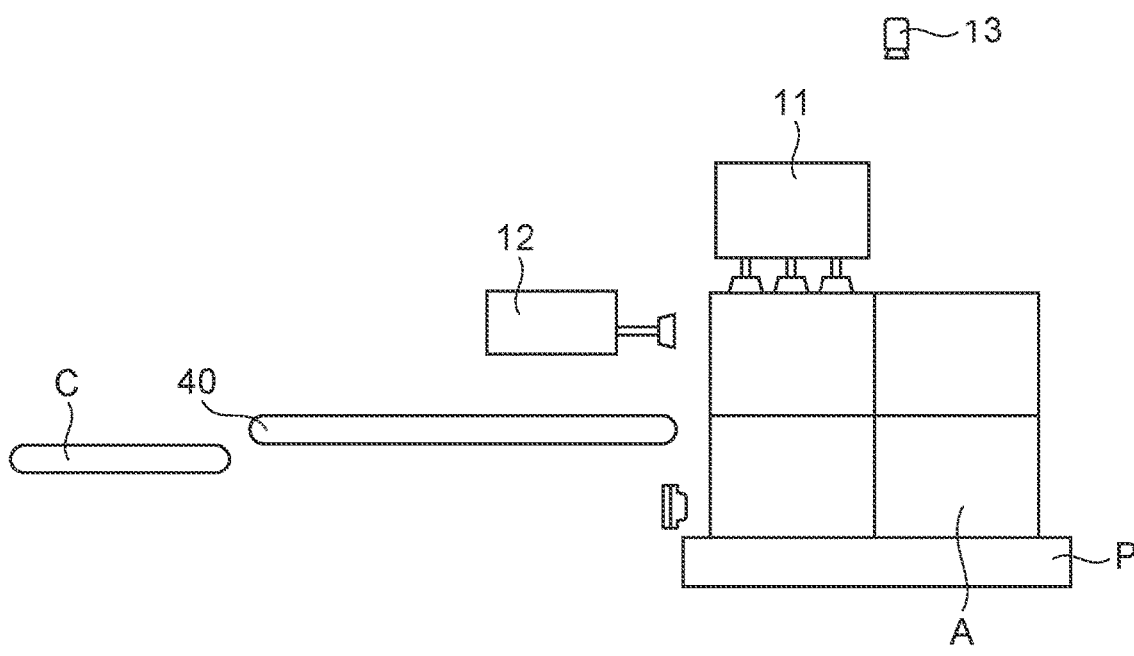

As shown in FIG. 9B, the control unit 60 presses the first holding unit 11 against the upper surface US of the article A. The rods 11c are displaced, and the suction pads 11d are deformed in accordance with a shape of the upper surface US. The control unit 60 operates an exhaust system to make a pressure inside the suction units 11b lower than an atmospheric pressure. Accordingly, the first holding unit 11 holds the upper surface US.

Figure 10A:
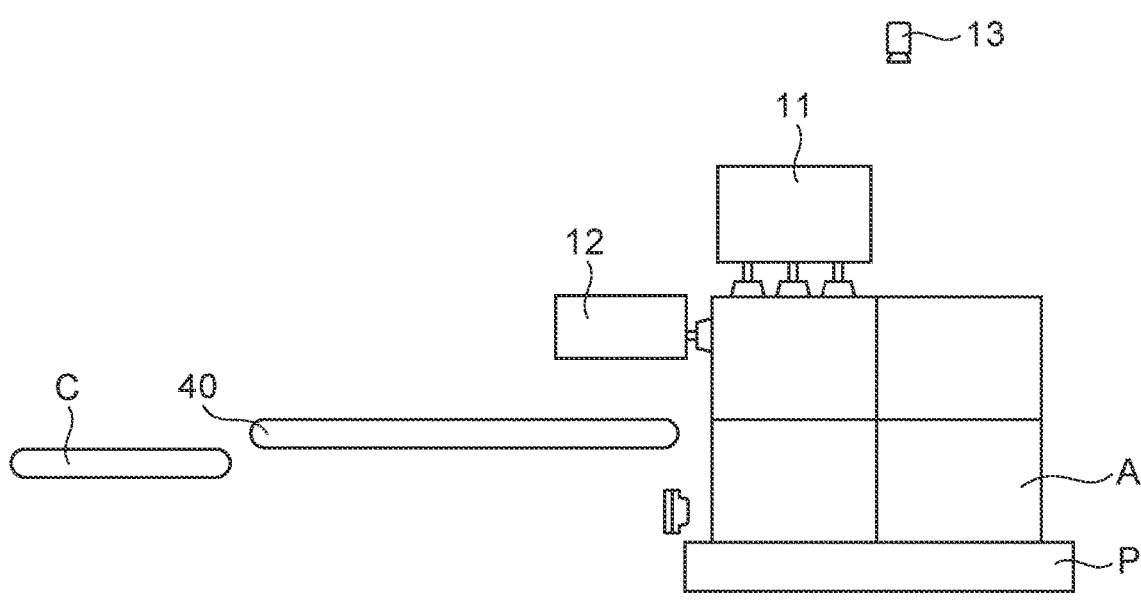
FIGS. 10A and 10B are schematic views showing the second operation of the cargo-handling apparatus according to the embodiment.

As shown in FIG. 10A, the control unit 60 moves the second holding unit 12 forward and presses the second holding unit 12 against the side surface SS of the article A. The rods 12c are displaced, and the suction pads 12d are deformed in accordance with a shape of the side surface SS. The control unit 60 operates an exhaust system to make a pressure inside the suction units 12b lower than the atmospheric pressure. Accordingly, the second holding unit 12 holds the side surface SS.

Figure 10B:
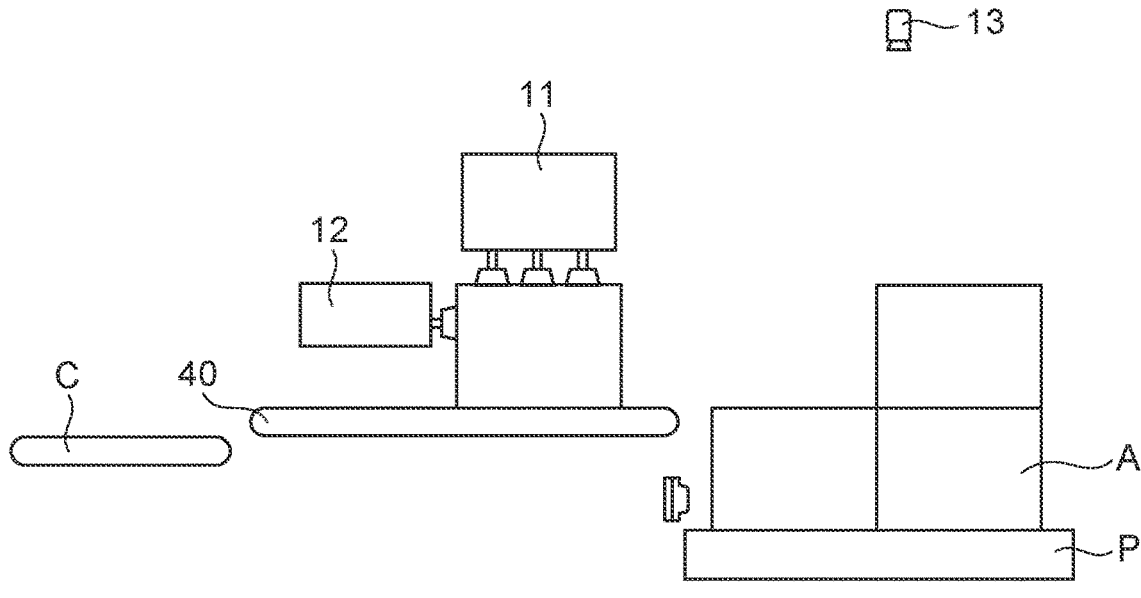

As shown in FIG. 10B, the control unit 60 moves the first holding unit 11 and the second holding unit 12 rearward to transport the article A from above the pallet P to above the lift 40. When the article A is transported onto the lift 40, the control unit 60 releases the holding by the first holding unit 11 and the second holding unit 12. That is, the control unit 60 increases the pressure inside the suction units 11b and the pressure inside the suction units 12b to weaken the suction force of the first holding unit 11 and the second holding unit 12.

Figure 11A:
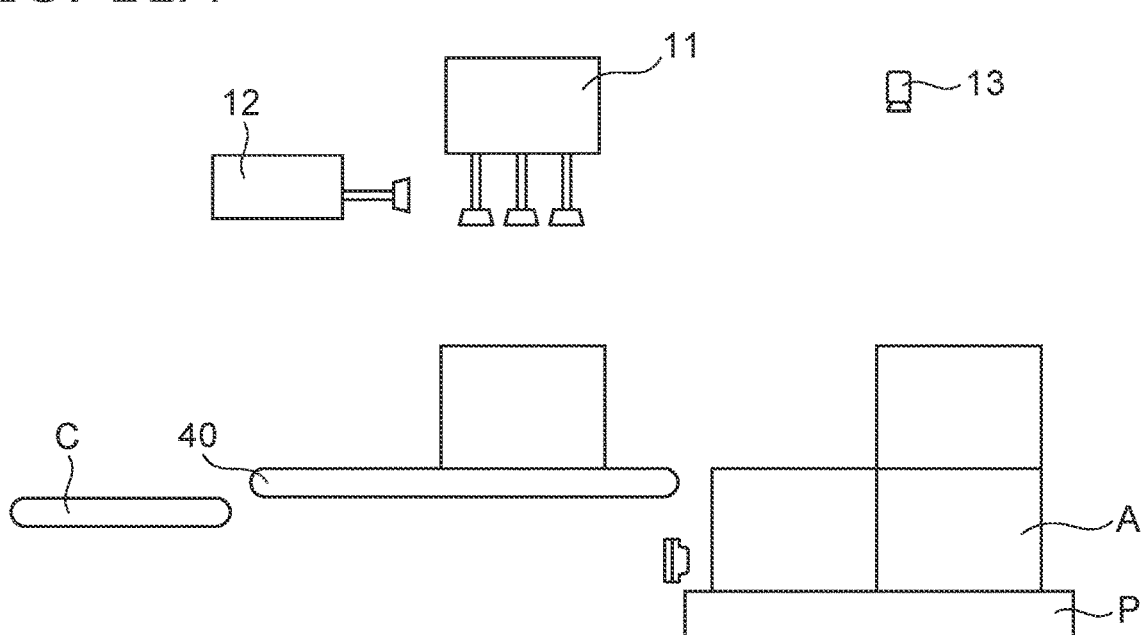
FIGS. 11A and 11B are schematic views showing the second operation of the cargo-handling apparatus according to the embodiment.
Figure 11B:
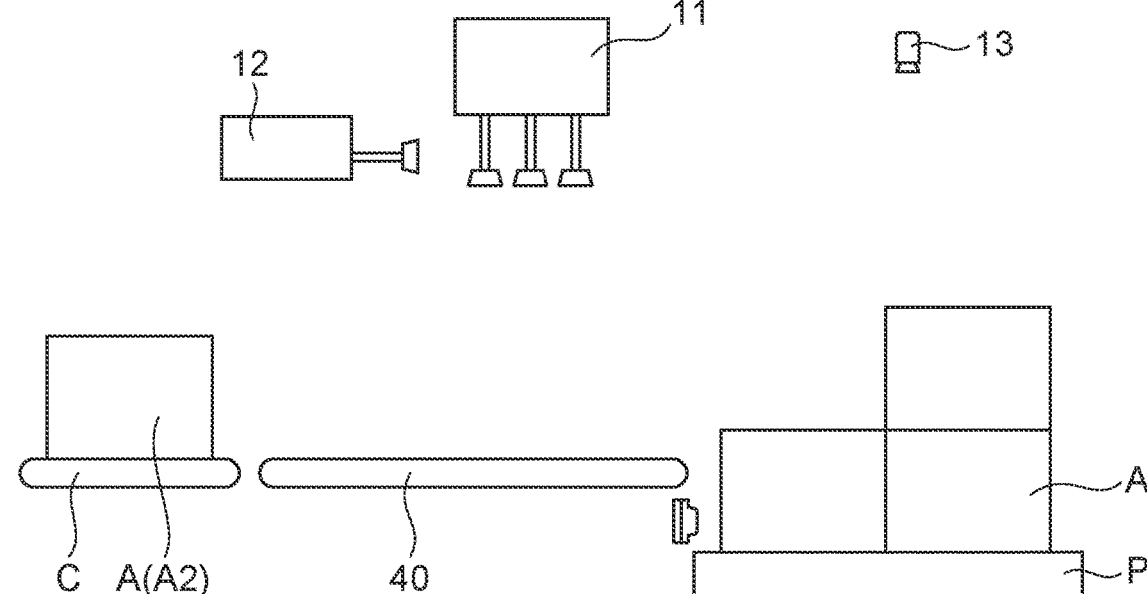

As shown in FIG. 11A, the control unit 60 separates the first holding unit 11 and the second holding unit 12 from the article A. The control unit 60 positions the upper surface of the lift 40 at the same height as the upper surface of the conveyor C. As shown in FIG. 11B, the lift 40 is operated to transport the article A onto the conveyor C. The conveyor C transports the article A to another place. Until all the articles A placed on the pallet P are dispensed, the cargo-handling apparatus 1 repeats the second operation shown in FIG. 9A to FIG. 11B.

Figure 12:
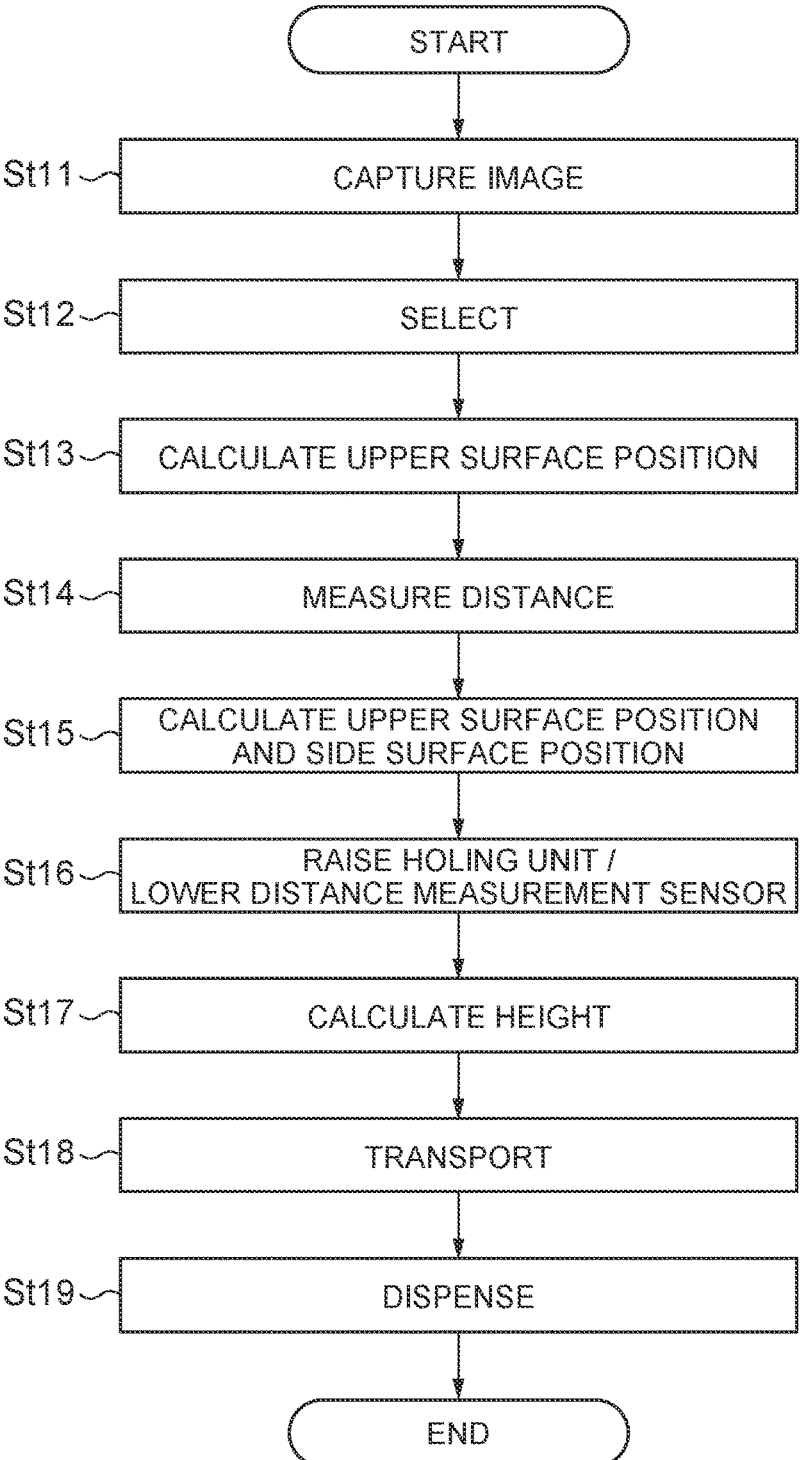
FIG. 12 is a flowchart showing the first operation of the cargo-handling apparatus according to the embodiment.

FIG. 12 is a flowchart showing the first operation of the cargo-handling apparatus according to the embodiment.

The image-capturing unit 13 captures an image of multiple articles A on the pallet P (step St11). The control unit 60 selects, based on an imaging result, an article whose upper surface is at the highest position (step St12). The control unit 60 calculates a position of the upper surface of the selected article A based on the imaging result (step St13). The distance measurement sensor 15 measures a distance to the selected article A (step St14). The control unit 60 calculates, based on a measurement result, a position of the upper surface and a position of the side surface of the article A (step St15). The control unit 60 causes the first holding unit 11 to hold the article A and raise the first holding unit 11 (step St16). At this time, the distance measurement sensor 15 is lowered while measuring the distance. The control unit 60 calculates a height of the article A based on the measurement result (step St17). The control unit 60 transports the article A (step St18). During transportation, the control unit 60 raises the holding unit 10, moves the holding unit 10 in the X-Y plane, and lowers the holding unit 10 toward the lift 40. When the article A is placed, a calculation result of the height is used. The article A is dispensed by the lift 40 and the conveyor C (step St19).

Figure 13:
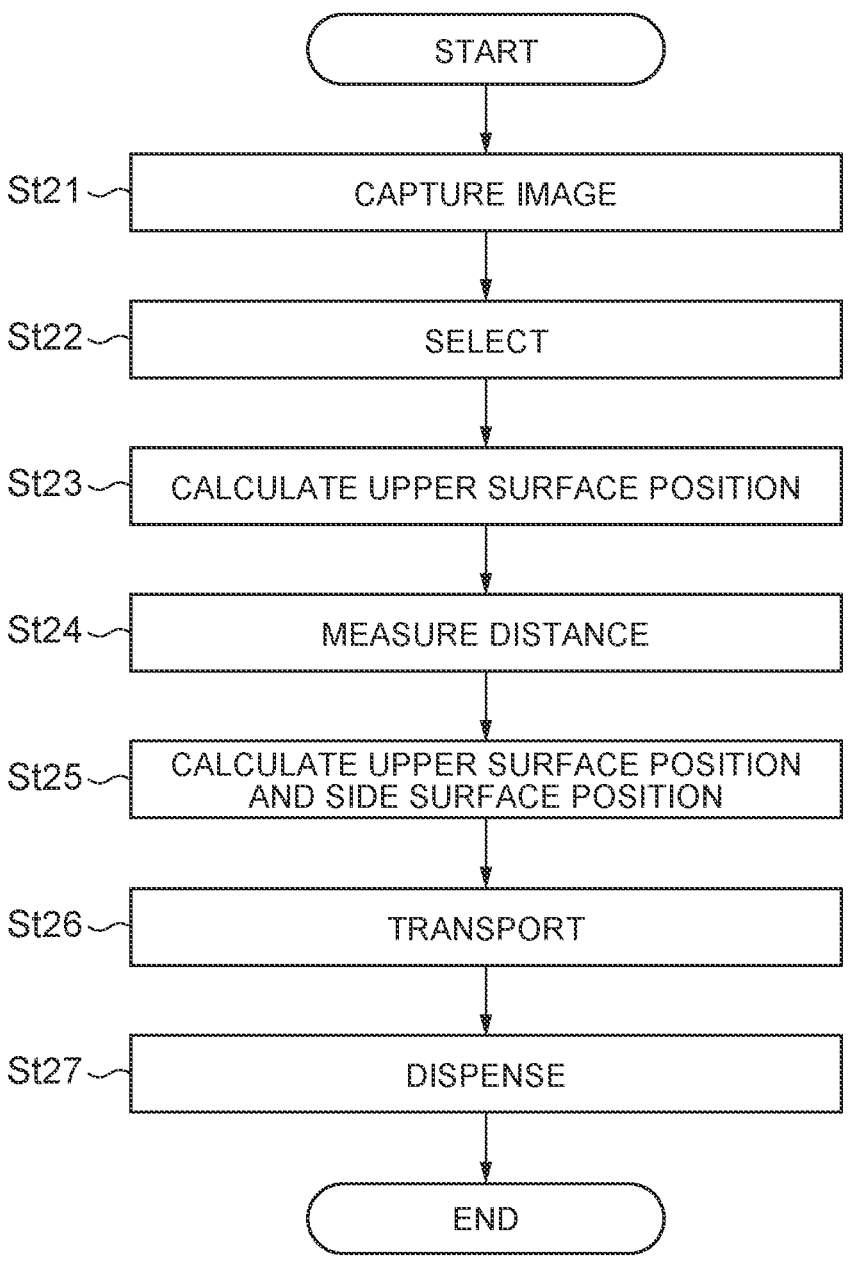
FIG. 13 is a flowchart showing the second operation of the cargo-handling apparatus according to the embodiment.

FIG. 13 is a flowchart showing the second operation of the cargo-handling apparatus according to the embodiment.

The image-capturing unit 13 captures an image of multiple articles A on the pallet P (step St21). The control unit 60 selects, based on an imaging result, an article whose upper surface is at the highest position and which is located at a position closest to the lift 40 (step St22). The control unit 60 calculates a position of the upper surface of the selected article A based on the imaging result (step St23). The distance measurement sensor 15 measures a distance to the selected article (step St24). The control unit 60 calculates, based on a measurement result, a position of the upper surface and a position of the side surface of the article A (step St25). The control unit 60 holds the article A by the first holding unit 11 and the second holding unit 12 and transports the article A (step St26). During transportation, the control unit 60 moves the holding unit 10 toward the lift 40. The article A is dispensed by the lift 40 and the conveyor C (step St27).

Favorable operations of the cargo-handling apparatus 1 according to the embodiment are described above. The operations of the cargo-handling apparatus 1 are not limited to the examples described above. For example, when the articles in the second arrangement are transported, the articles A may be sequentially transported from the article A whose upper surface is at the highest position and which is away from the lift 40. In this case, similarly to the first operation, the cargo-handling apparatus 1 holds the article A using only the first holding unit 11. When the first holding unit 11 is raised, the distance measurement by the distance measurement sensor 15 and the calculation of the height of the article A as described above may be executed.

Advantages of the embodiment will be described.

The cargo-handling apparatus 1 is required to be able to transport more articles in a shorter time. That is, an improvement in transport efficiency is required. For example, a transport time of the articles can be shortened by accelerating the movement of the holding unit 10. However, if the movement of the holding unit 10 is too fast during the holding of the article, the article may fall. Therefore, it is favorable to accelerate the movement of the holding unit 10 except during the holding of the article. On the other hand, when an article comes into contact with the holding unit 10 moving at a high speed, the article is damaged. When the movement of the holding unit 10 is decelerated in order to prevent the damage to the article, a movement time of the holding unit 10 increases, and the transport efficiency decreases.

Regarding the problem, a method of calculating a position of an upper surface of a held article in advance may be considered. At a position away from the upper surface, the holding unit 10 is moved at the first speed. After the movement at the first speed, the holding unit 10 is moved at the second speed at a position close to the upper surface. The second speed is slower than the first speed. Accordingly, it is possible to reduce the possibility that the holding unit 10 comes into contact with the article at a high speed while shortening the movement time of the holding unit 10.

In the above-described method, the more accurately the position of the upper surface is calculated, the more the transport efficiency can be improved. If an error of the calculated position of the upper surface is large, the holding unit 10 may come into contact with the article during the movement of the holding unit 10 at the first speed. As the accuracy is higher, a distance by which the holding unit 10 can move at the first speed can be set longer when the holding unit 10 is lowered, and the movement time can be further shortened.

In the cargo-handling apparatus 1 according to the embodiment, the control unit 60 selects an article to be held based on the imaging result of the image-capturing unit 13. Then, the control unit 60 calculates the position of the upper surface of the article based on the measurement result by the distance measurement sensor 15. By using the measurement result of the distance measurement sensor 15, the position of the upper surface can be calculated more accurately than in the case of using the imaging result. By operating the holding unit 10 in accordance with the calculated position of the upper surface, it is possible to further shorten the movement time while reducing the possibility that the holding unit 10 comes into contact with the article at a high speed.

Further, in the cargo-handling apparatus 1, the control unit 60 calculates the position of the side surface of the article using the measurement result of the distance measurement sensor 15. When the articles in the first arrangement are transported, it is possible to prevent the first holding unit 11 from being displaced from the upper surface of the articles by improving the accuracy of the position of the side surface. As a result, the article can be held more stably. When the articles in the second arrangement are transported, it is possible to prevent the second holding unit 12 from interfering with the held article or other articles by improving the accuracy of the position of the side surface. The possibility that the article is damaged can be reduced.

In order to shorten the transport time and prevent damage to the article, it is favorable to calculate a height of the held article. The height of the article is referred to when the article is placed. For example, the control unit 60 lowers the holding unit 10 at the third speed at a position away from a placement location. After lowering at the third speed, the control unit 60 lowers the holding unit 10 at the fourth speed at a position close to the placement location. The fourth speed is slower than the third speed. Accordingly, it is possible to reduce the transport time of the holding unit 10 while reducing the possibility that the article comes into contact with the placement location at a high speed.

The accuracy of the calculated height is also favorably high. In the cargo-handling apparatus 1, the control unit 60 calculates the height of the article based on the measurement result of the distance measurement sensor 15 while the holding unit 10 holding the article is being raised. By using the measurement result of the distance measurement sensor 15 for the calculation of the height, the accuracy of the height can be improved. When the holding unit 10 is lowered, the distance by which the holding unit 10 can move at the third speed can be set to be longer, and the transport time can be further shortened.

Further, in the cargo-handling apparatus 1, the distance measurement sensor 15 is lowered while measuring the distance while the holding unit 10 holding the article is being raised. Accordingly, a time from the detection of the upper surface of the article to the detection of a bottom surface of the article can be shortened, and a timing at which the height is calculated can become earlier. Control according to the calculated height can be started earlier. Accordingly, the transport time can be further shortened.

In order to further improve the accuracy of the height of the article, it is desired to consider a communication time between the distance measurement sensor 15 and the control unit 60. This is because a slight error occurs in the calculated height depending on the communication time. Hereinafter, a method for reducing an error due to the communication time will be described.

Figure 14:
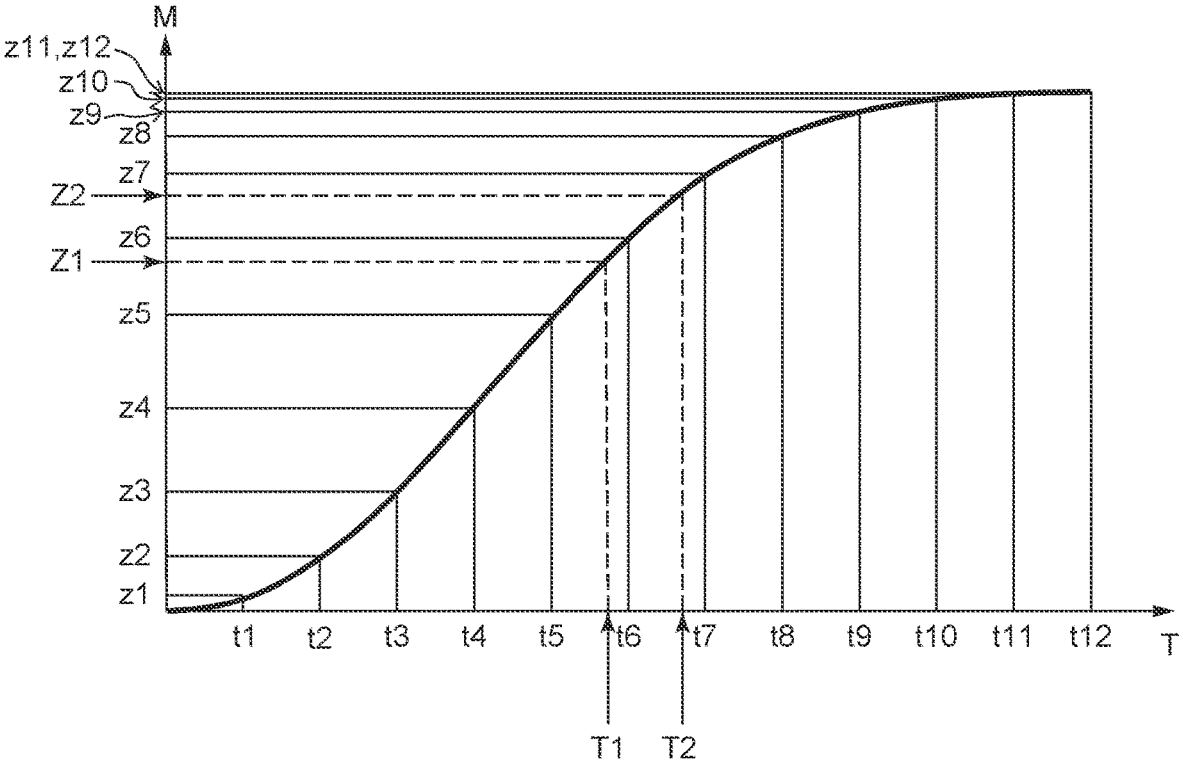
FIG. 14 is a graph showing a relationship between a time and a movement amount for a holding unit and a distance measurement sensor.

FIG. 14 is a graph showing a relationship between a time and a movement amount for the holding unit and the distance measurement sensor.

In FIG. 14, a horizontal axis represents a time T. A vertical axis represents a movement amount M of each of the holding unit 10 and the distance measurement sensor 15. Thick solid lines represent changes in the movement amount of the holding unit 10 and the distance measurement sensor 15 with respect to times. In the example, a movement amount of the holding unit 10 with respect to a time is the same as a movement amount of the distance measurement sensor 15 with respect to a time.

For example, the control unit 60 includes an overall control unit and a monitoring unit. The overall control unit controls the entire cargo-handling apparatus 1. The monitoring unit detects an upper surface, a side surface, a lower surface, and the like of the article A based on a measurement result by the distance measurement sensor 15. The monitoring unit is provided, for example, together with the distance measurement sensor 15.

As an example, the monitoring unit detects the lower surface of the article A to be raised at a time point T1. The monitoring unit transmits a detection result of the lower surface to the overall control unit. The overall control unit receives the detection result at a time point T2. In a method according to a reference example, the overall control unit calculates a height of an article based on a movement amount Z2 of the holding unit 10 and the distance measurement sensor 15 from the start of the raising of the holding unit 10 to the time point T2. Actually, at the time point T1 when the lower surface is detected, a movement amount of the holding unit 10 and the distance measurement sensor 15 is a movement amount Z1. In the method according to the reference example, an error according to a difference between the movement amounts Z1 and Z2 occurs in the height of the article A due to a time required for communication.

In order to reduce the error, in the cargo-handling apparatus 1, movement data of the holding unit 10 and movement data of the distance measurement sensor are recorded. The movement data of the holding unit 10 shows a movement amount of the holding unit 10 for each time while the holding unit 10 is raised. The movement data of the distance measurement sensor 15 shows a movement amount of the distance measurement sensor 15 for each time while the distance measurement sensor 15 is lowered. The movement amount for each time is recorded regardless of the detection of the lower surface. For example, as shown in FIG. 14, movement amounts z1 to z12 at time points t1 to t12 are recorded.

When the lower surface is detected, the monitoring unit generates a time stamp at the time point t6 closest to the time point T1 at which the lower surface is detected. The monitoring unit transmits a detection result of the lower surface and the time stamp to the overall control unit. The overall control unit calculates the height of the article A based on the time stamp showing a detection timing of the lower surface, the movement data of the holding unit 10, and the movement data of the distance measurement sensor 15. Specifically, the overall control unit refers to the movement amount z6 at the time point t6 for each of the holding unit 10 and the distance measurement sensor 15, and calculates the height of the article A based on the movement amount z6. An error corresponding to a difference between the movement amounts Z1 and z6 occurs in the height of the article A. The error can be made smaller than the error according to the difference between the movement amounts Z1 and Z2 described above.

Figure 15:
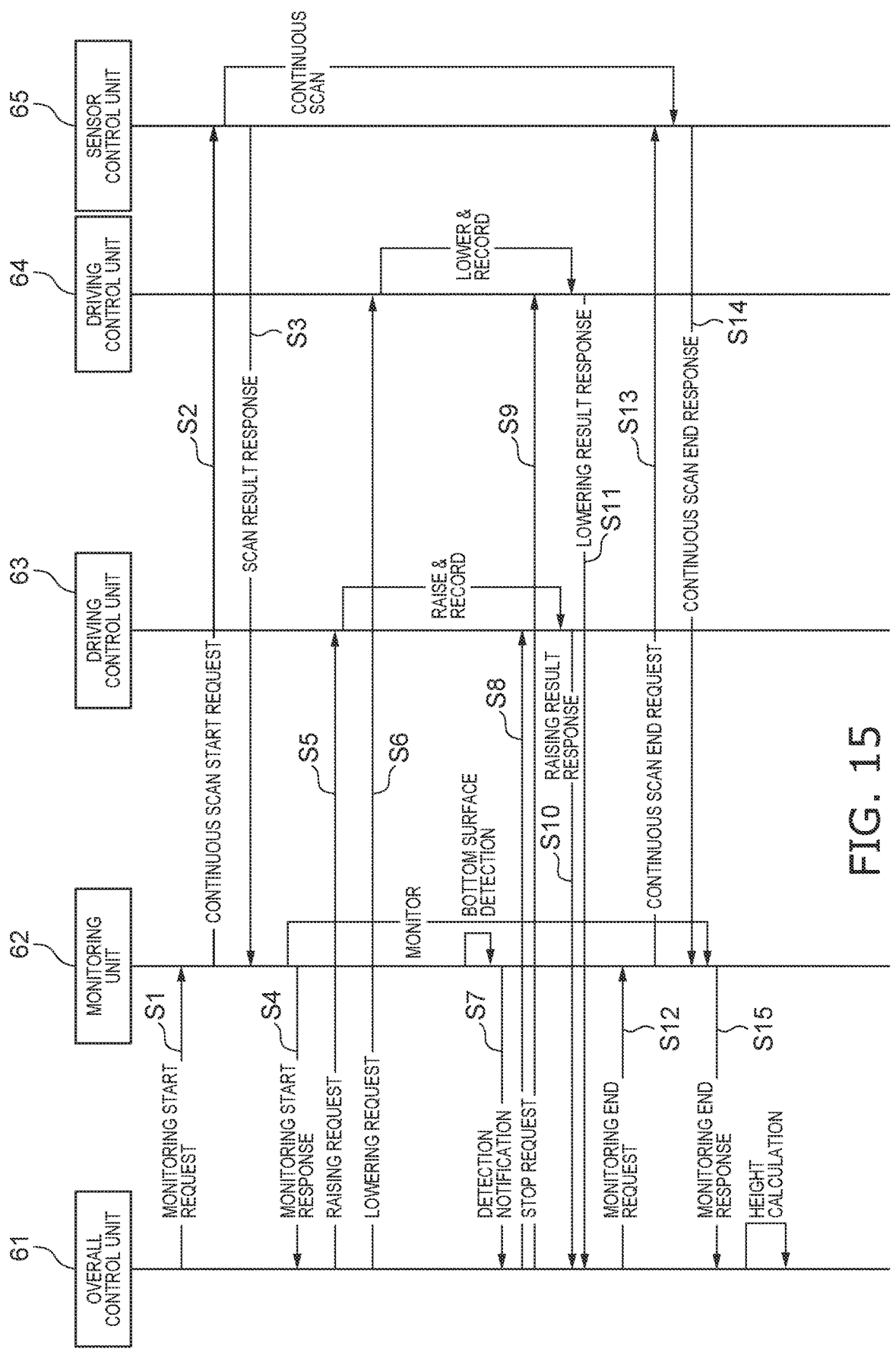
FIG. 15 is a control sequence diagram when a height of an article is calculated.

FIG. 15 is a control sequence diagram when the height of the article is calculated.

For example, as shown in FIG. 15, the control unit 60 includes an overall control unit 61, a monitoring unit 62, a driving control unit 63, a driving control unit 64, and a sensor control unit 65. The driving control unit 63 controls each driving unit for moving the holding unit 10. The driving control unit 64 controls a driving unit 15z for moving the distance measurement sensor 15. The sensor control unit 65 controls an operation of the distance measurement sensor 15.

The overall control unit 61 transmits a monitoring start request S1 to the monitoring unit 62. When the monitoring unit 62 receives the monitoring start request S1, the monitoring unit 62 transmits a continuous scan start request S2 to the sensor control unit 65. When the sensor control unit 65 receives the continuous scan start request S2, the sensor control unit 65 starts a continuous scan (repetition of distance measurement). The sensor control unit 65 transmits a scan result response S3 to the monitoring unit 62 each time a scan result is obtained during the continuous scan. When the monitoring unit 62 receives a first scan result response S3, the monitoring unit 62 transmits a monitoring start response S4 to the overall control unit 61. The monitoring start response S4 shows that the monitoring unit 62 starts monitoring lower surface detection.

When the overall control unit 61 receives the monitoring start response S4, the overall control unit 61 transmits a raising request S5 to the driving control unit 63. When the driving control unit 63 receives the raising request S5, the driving control unit 63 raises the holding unit 10. The driving control unit 63 records a movement amount for each time during the raising. When the overall control unit 61 receives the monitoring start response S4, the overall control unit 61 transmits a lowering request S6 to the driving control unit 64. When the driving control unit 64 receives the lowering request S6, the driving control unit 64 lowers the distance measurement sensor 15. The driving control unit 64 records a movement amount for each time during the lowering.

The monitoring unit 62 monitors the lower surface detection of the article based on the scan result response S3 during the continuous scan. When the lower surface is detected, the monitoring unit 62 transmits a detection notification S7 to the overall control unit 61. The detection notification S7 shows that the lower surface is detected, and includes a time stamp showing a timing of the lower surface detection. When the overall control unit 61 receives the detection notification S7, the overall control unit 61 transmits stop requests S8 and S9 to the driving control units 63 and 64, respectively.

When the driving control unit 63 receives the stop request S8, the driving control unit 63 transmits a raising result response S10 to the overall control unit 61. The raising result response S10 includes movement data of the holding unit 10 during the raising. When the driving control unit 64 receives the stop request S9, the driving control unit 64 transmits a lowering result response S11 to the overall control unit 61. The lowering result response S11 includes movement data of the distance measurement sensor 15 during the lowering.

When the overall control unit 61 receives the raising result response S10 and the lowering result response S11, the overall control unit 61 transmits a monitoring end request S12 to the monitoring unit 62. When the monitoring unit 62 receives the monitoring end request S12, the monitoring unit 62 transmits a continuous scan end request S13 to the sensor control unit 65. When the sensor control unit 65 receives the continuous scan end request S13, the sensor control unit 65 ends the continuous scan. The sensor control unit 65 transmits a continuous scan end response S14 to the monitoring unit 62. The continuous scan end response S14 shows that the continuous scan is ended.

When the monitoring unit 62 receives the continuous scan end response S14, the monitoring unit 62 transmits a monitoring end response S15 to the overall control unit 61. When the overall control unit 61 receives the monitoring end response S15, the overall control unit 61 calculates the height of the article based on the time stamp included in the detection notification S7, the movement data included in the raising result response S10, and the movement data included in the lowering result response S11.

Figure 16A:
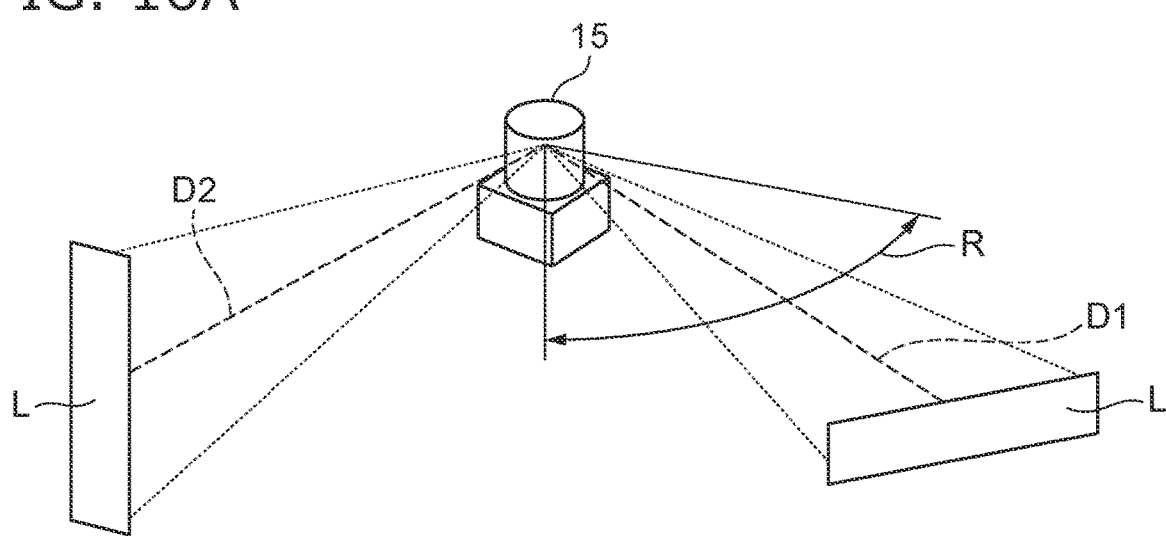
FIG. 16A is a schematic view showing the distance measurement sensor.
Figure 16B:
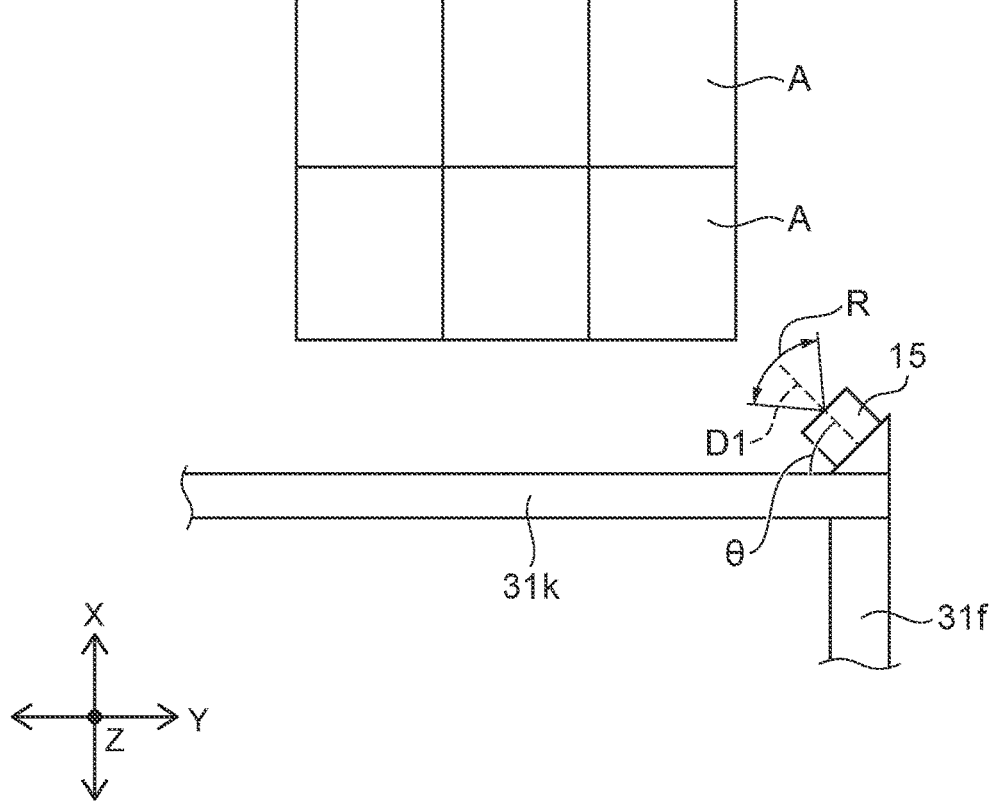
FIG. 16B is a schematic plan view showing a vicinity of the distance measurement sensor in the cargo-handling apparatus according to the embodiment.

FIG. 16A is a schematic view showing the distance measurement sensor. FIG. 16B is a schematic plan view showing a vicinity of the distance measurement sensor in the cargo-handling apparatus according to the embodiment.

Laser light is favorably used for the distance measurement sensor 15. The laser light has small diffusion and high directivity as compared with normal light. By using the laser light, accuracy in distance measurement can be improved.

With respect to the laser light, in general, spread of the light changes according to a direction of the distance measurement sensor 15. For example, as shown in FIG. 16A, in a front surface direction D1 of the distance measurement sensor 15, spread of light L in one direction is small, and the spread of the light L in a direction orthogonal to the one direction is large. In a side surface direction D2 of the distance measurement sensor 15, the spread of the light L in the one direction is large, and the spread of the light L in an orthogonal direction is small.

In the cargo-handling apparatus 1, the upper surface and the lower surface of the article are detected based on the measurement result of the distance measurement sensor 15. In order to improve the accuracy in detection, it is favorable that the spread in a longitudinal direction of the light emitted toward the article is small. In the cargo-handling apparatus 1, the distance measurement sensor 15 is attached such that the one direction is parallel to the longitudinal direction. As shown in FIG. 16B, an angle θ of the front surface direction D1 of the distance measurement sensor 15 with respect to the X-direction and a lateral direction is set to 45 degrees. That is, as shown in FIG. 16A and FIG. 16B, the article is irradiated with the light L in a range R from about +40° to about −40° with respect to the front surface direction D1. Accordingly, the light L having a small spread in the longitudinal direction can be emitted toward the article.

That is, when an irradiation range of the laser light includes a first range in which the spread in the longitudinal direction is relatively small and a second range in which the spread in the longitudinal direction is relatively large, the distance measurement sensor 15 favorably irradiates the article with the laser light in the first range.

Figure 17:
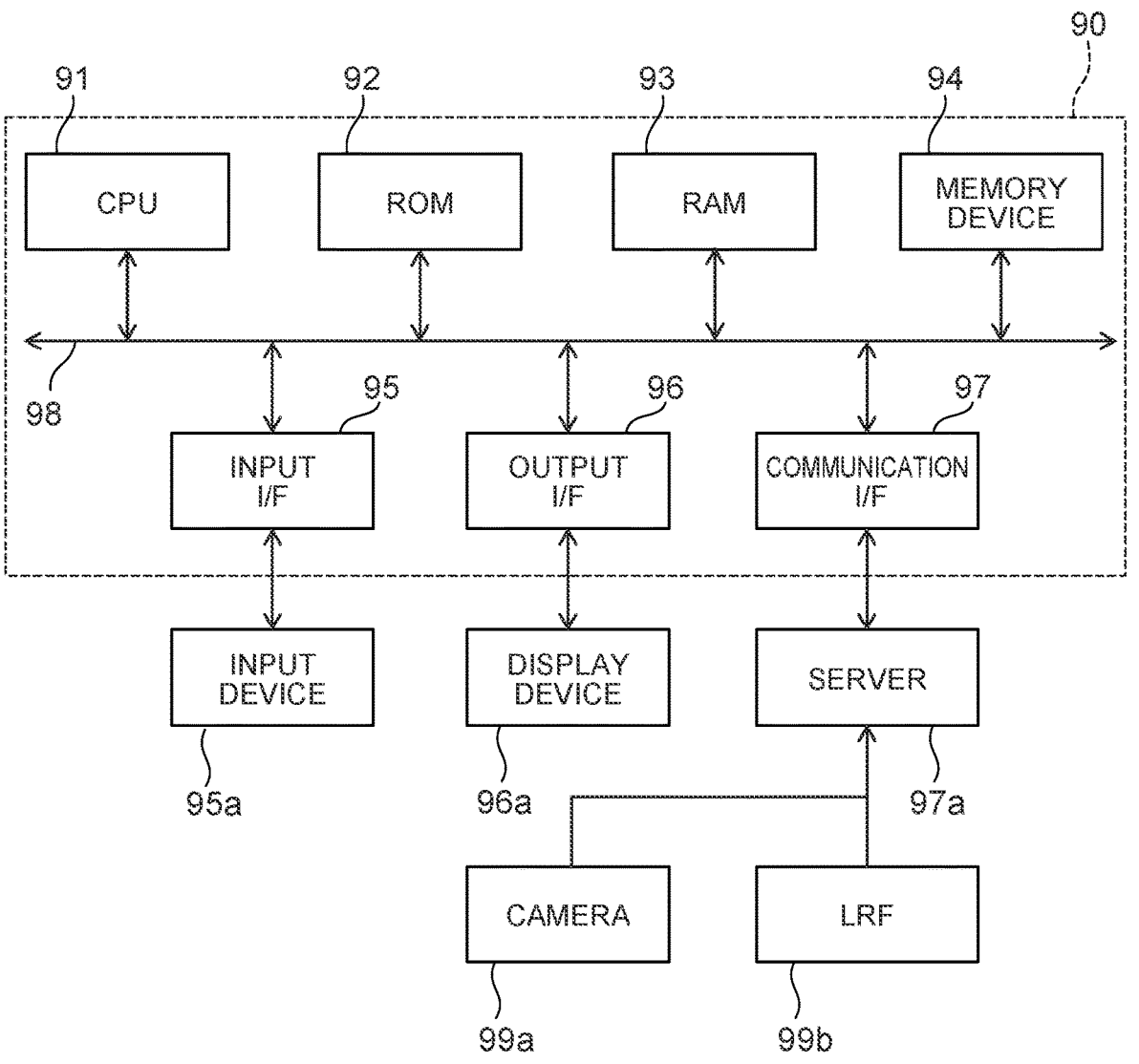
FIG. 17 is a schematic view showing a hardware configuration.

FIG. 17 is a schematic view showing a hardware configuration.

The control unit 60 includes, for example, a hardware configuration shown in FIG. 17. A processing device 90 shown in FIG. 17 includes a CPU 91, a ROM 92, a RAM 93, a memory device 94, an input interface 95, an output interface 96, and a communication interface 97.

The ROM 92 stores a program for controlling an operation of the computer. The ROM 92 stores a program necessary for the computer to implement the above-described processing. The RAM 93 functions as a memory area onto which the program stored in the ROM 92 is expanded.

The CPU 91 includes a processing circuit. The CPU 91 executes a program stored in at least one of the ROM 92 and the memory device 94 by using the RAM 93 as a work memory. During the execution of the program, the CPU 91 controls each configuration via a system bus 98 to execute various types of processing.

The memory device 94 stores data necessary for the execution of the program and data obtained by the execution of the program.

The input interface (I/F) 95 connects the processing device 90 and an input device 95a. The input I/F 95 is, for example, a serial bus interface such as a USB. The CPU 91 can read various types of data from the input device 95a via the input I/F 95.

The output interface (I/F) 96 connects the processing device 90 and a display device 96a. The output I/F 96 is, for example, a video output interface such as a digital visual interface (DVI) or a high-definition multimedia interface (HDMI (registered trademark)). The CPU 91 can transmit data to the display device 96a via the output I/F 96 and cause the display device 96a to display an image.

The communication interface (I/F) 97 connects a server 97a outside the processing device 90 to the processing device 90. The communication I/F 97 is, for example, a network card such as a LAN card. The CPU 91 can read various types of data from the server 97a via the communication I/F 97. A camera 99a captures an image of an article and stores the image in the server 97a. The camera 99a functions as the image-capturing unit 13. A LRF 99b measures a distance and stores a measurement result in the server 97a. The LRF 99b functions as the distance measurement sensor 15.

The memory device 94 includes one or more selected from a hard disk drive (HDD) and a solid state drive (SSD). The input device 95a includes one or more selected from a mouse, a keyboard, a microphone (voice input), and a touch pad. The display device 96a includes one or more selected from a monitor and a projector. A device having both functions of the input device 95a and the display device 96a, such as a touch panel, may be used.

Processing of the various types of data described above may be recorded on a magnetic disk (a flexible disk, a hard disk, or the like), an optical disk (CD-ROM, CD-R, CD-RW, DVD-ROM, DVD+R, DVD+RW, or the like), a semiconductor memory, or another non-transitory computer-readable storage medium as a program that can be executed by a computer.

For example, information recorded in the recording medium can be read by a computer (or an embedded system). In the recording medium, a recording format (storage format) is set as desired. For example, the computer reads a program from the recording medium and causes the CPU to execute instructions described in the program based on the program. In the computer, acquisition (or reading) of the program may be performed through a network.

In the embodiment illustrated above, the first direction is parallel to the vertical direction. The embodiment is not limited to the example, and the first direction may be parallel to the horizontal direction. In either case, positions of different faces of an article can be calculated based on an imaging result of the image-capturing unit 13 and a measurement result of the distance measurement sensor 15. When the article is moved in the first direction by the holding unit 10, a length of the article in the first direction can be calculated at an earlier timing by moving the distance measurement sensor 15 in a direction opposite to that of the holding unit 10. Control according to the length of the article in the first direction can be started earlier.

The embodiment may include the following features.
(Feature 1)
  A cargo-handling apparatus comprising:
  a holding unit configured to hold an article;
  an image-capturing unit configured to capture an image of the article in a first direction;
  a distance measurement sensor configured to measure a distance to the article in a second direction crossing the first direction; and
  a control unit configured to control the holding unit,
  the control unit being configured to
    select a first article to be held based on an imaging result by the image-capturing unit, calculate, based on a measurement result by the distance measurement sensor, a position of a first face of the first article crossing the first direction and a position of a second face of the first article crossing the second direction, and cause the holding unit to operate in accordance with the calculated position of the first face and the calculated position of the second face to hold the first article.

(Feature 2)

The apparatus according to feature 1, wherein when holding the first article, the control unit moves the holding unit toward the first article in the first direction at a first speed, and then moves the holding unit in the first direction at a second speed slower than the first speed.

(Feature 3)

The apparatus according to feature 1 or 2, wherein the first direction is parallel to an up-down direction.

(Feature 4)

The apparatus according to feature 1 or 2, wherein when holding the first article, the control unit lowers the holding unit at a first speed toward the first article and then lowers the holding unit at a second speed slower than the first speed.

(Feature 5)

The apparatus according to any one of features 1 to 4, wherein the control unit is configured to calculate a length of the first article in the first direction based on a measurement result of a first distance from the first article by the distance measurement sensor during movement of the holding unit holding the first article in the first direction.

(Feature 6)

The apparatus according to feature 5, wherein the control unit moves the distance measurement sensor in a direction opposite to the holding unit while measuring the first distance by the distance measurement sensor during the movement of the holding unit holding the first article in the first direction.

(Feature 7)

The apparatus according to feature 6, wherein the control unit is configured to acquire a movement amount of the holding unit for each time during the movement of the holding unit in the first direction, acquire a movement amount of the distance measurement sensor for each time during movement of the distance measurement sensor in the first direction, acquire a detection timing of an end portion of the first article in the first direction by the distance measurement sensor, and calculate the length of the first article based on the movement amount of the holding unit and the movement amount of the distance measurement sensor at the detection timing.

(Feature 8)

The apparatus according to any one of features 5 to 7, wherein the control unit operates the holding unit in accordance with the measured length of the first article when the first article is placed.

(Feature 9)

The apparatus according to feature 8, wherein when the first article is placed, the control unit moves the holding unit toward a placement location at a third speed and then moves the holding unit at a fourth speed slower than the third speed.

(Feature 10)

A cargo-handling apparatus comprising:

a holding unit configured to hold an article;

an image-capturing unit configured to capture an image of the article in a first direction; and a distance measurement sensor configured to measure a distance to the article in a second direction crossing the first direction, after capturing of the image by the image-capturing unit and measurement of the distance to one article by the distance measurement sensor, the distance measurement sensor measuring the distance to the one article while moving in a direction opposite to the holding unit while the holding unit holding the one article and moving in the first direction.

(Feature 11)

The apparatus according to feature 10, wherein the first direction is parallel to an up-down direction.

(Feature 12)

The apparatus according to any one of features 1 to 11, wherein the distance measurement sensor measures the distance by using laser light, and an irradiation range of the laser light includes a first range in which spread in the first direction is relatively small and a second range in which the spread in the first direction is relatively large, and the distance measurement sensor irradiates the article with the laser light in the first range.

(Feature 13)

The apparatus according to any one of features 1 to 9, further comprising a transport unit on which the article is placed, the control device unit causes the holding unit (10) to transport the held first article to the transport unit, and causes the transport unit to transport the placed first article.

According to the embodiment described above, the cargo-handling apparatus 1 capable of improving the transport efficiency is provided. According to the control unit 60 (control device) or the control method thereof described above, it is possible to improve the transport efficiency of the cargo-handling apparatus 1. Same effects can be obtained by using a program for causing a computer to execute the above-described control method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A handling apparatus comprising:

a holding unit configured to hold an object, wherein the holding unit includes a plurality of first suction units configured to hold an upper surface of the object via vacuum suction, and a plurality of second suction units configured to hold a side surface of the object via vacuum suction simultaneously with the plurality of first suction units;

an image-capturing unit configured to capture an image of the object in a first direction;

a distance measurement sensor configured to measure a distance between the object and the distance measurement sensor in a second direction crossing the first direction;

a vertical frame;

a guide attached to the vertical frame and extending in the first direction; and a control unit configured to control the holding unit, the control unit being configured to select a first object to be held based on an imaging result by the image-capturing unit, calculate, based on a measurement result by the distance measurement sensor, a position of an upper surface of the first object crossing the first direction and a position of a side surface of the first object crossing the second direction, and cause the holding unit to operate in accordance with the position of the upper surface of the first object and the position of the side surface of the first object to hold the first object, when the holding unit holds the first object and is moved in the first direction, the distance measurement sensor is moved in a direction opposite to the holding unit along the guide via an actuator while measuring a first distance from the first object by the distance measurement sensor, and the control unit being configured to calculate a length of the first object in the first direction based on a measurement result of the first distance.

2. The apparatus according to claim 1, wherein the control unit is further configured to move the holding unit toward the first object in the first direction at a first speed, move the holding unit in the first direction at a second speed slower than the first speed, and then cause the holding unit to hold the first object.

3. The apparatus according to claim 1, wherein the first direction is parallel to an up-down direction.

4. The apparatus according to claim 3, wherein the control unit is further configured to lower the holding unit at a first speed toward the first object, lower the holding unit at a second speed slower than the first speed, and then cause the holding unit to hold the first object.

5. The apparatus according to claim 1, wherein the distance measurement sensor is a laser range finder.

6. The apparatus according to claim 1, wherein the control unit is further configured to acquire a movement amount of the holding unit for each time during the movement of the holding unit in the first direction, acquire a movement amount of the distance measurement sensor for each time during movement of the distance measurement sensor in the first direction, acquire a detection timing of an end portion of the first object in the first direction by the distance measurement sensor, and calculate the length of the first object based on the movement amount of the holding unit and the movement amount of the distance measurement sensor at the detection timing.

7. The apparatus according to claim 5, wherein when the control unit is further configured to move the holding unit to a placement location where the first object is placed, and adjust a movement speed of the holding unit in accordance with the measured length of the first object.

8. The apparatus according to claim 7, wherein the control unit is further configured to move the holding unit toward the placement location at a third speed, move the holding unit at a fourth speed slower than the third speed to the placement location, and then cause the holding unit to place the first object at the placement location.

9. The apparatus according to claim 1, wherein the distance measurement sensor measures the distance by using laser light, an irradiation range of the laser light includes a first range and a second range, a spread of the laser light along the first direction in the first range is smaller than a spread of the laser light along the first direction in the second range, and the distance measurement sensor irradiates the object with the laser light in the first range.

10. The apparatus according to claim 1, further comprising a transport unit on which the object is placed, wherein the control unit is further configured to cause the holding unit to transport the held first object to the transport unit and place the first object on the transport unit, and cause the transport unit to transport the placed first object.

11. A control device configured to control a handling apparatus including a holding unit configured to hold an object, wherein the holding unit includes a plurality of first suction units configured to hold an upper surface of the object via vacuum suction, and a plurality of second suction units configured to hold a side surface of the object via vacuum suction simultaneously with the plurality of first suction units, an image-capturing unit configured to capture an image of the object in a first direction, a distance measurement sensor configured to measure a distance to the object in a second direction crossing the first direction, a vertical frame, and a guide attached to the vertical frame and extending in the first direction, the control device being configured to:

select a first object to be held based on an imaging result by the image-capturing unit;

calculate, based on a measurement result by the distance measurement sensor, a position of an upper surface of the first object crossing the first direction and a position of a side surface of the first object crossing the second direction; and cause the holding unit to hold the first object in accordance with the position of the upper surface and the position of the side surface, when the holding unit holds the first object and is moved in the first direction, the control device is configured to causes the distance measurement sensor to move in a direction opposite to the holding unit along the guide via an actuator while measuring a first distance from the first object by the distance measurement sensor, the control device being configured to calculate a length of the first object in the first direction based on a measurement result of the first distance.

12. The device according to claim 11, wherein a movement amount of the holding unit for each time is acquired during the movement of the holding unit in the first direction, a movement amount of the distance measurement sensor for each time is acquired during movement of the distance measurement sensor in the first direction, a detection timing of an end portion of the first object in the first direction by the distance measurement sensor is acquired, and the length of the first object is calculated based on the movement amount of the holding unit and the movement amount of the distance measurement sensor at the detection timing.

13. A control method of a handling apparatus including a holding unit configured to hold an object, wherein the holding unit includes a plurality of first suction units configured to hold an upper surface of the object via vacuum suction, and a plurality of second suction units configured to hold a side surface of the object via vacuum suction simultaneously with the plurality of first suction units, an image-capturing unit configured to capture an image of the object in a first direction, a distance measurement sensor configured to measure a distance to the object in a second direction crossing the first direction, a vertical frame, and a guide attached to the vertical frame and extending in the first direction, the method comprising:

selecting a first object to be held based on an imaging result by the image-capturing unit;

calculating, based on a measurement result by the distance measurement sensor, a position of an upper surface of the first object crossing the first direction and a position of a side surface of the first object crossing the second direction; and causing the holding unit to hold the first object in accordance with the position of the upper surface and the position of the side surface, in response to the holding unit holding the first object and moving in the first direction, moving the distance measurement sensor in a direction opposite to the holding unit along the guide via an actuator while measuring a first distance from the first object by the distance measurement sensor, a length of the first object in the first direction being calculated based on a measurement result of the first distance.

14. The method according to claim 13, further comprising:

acquiring a movement amount of the holding unit for each time during the movement of the holding unit in the first direction;

acquiring a movement amount of the distance measurement sensor for each time during movement of the distance measurement sensor in the first direction;

acquiring a detection timing of an end portion of the first object in the first direction by the distance measurement sensor; and calculating the length of the first object based on the movement amount of the holding unit and the movement amount of the distance measurement sensor at the detection timing.

15. A non-transitory computer-readable storage medium storing a program that causes a computer to control a handling apparatus, the handling apparatus including a holding unit configured to hold an object, wherein the holding unit includes a plurality of first suction units configured to hold an upper surface of the object via vacuum suction, and a plurality of second suction units configured to hold a side surface of the object via vacuum suction simultaneously with the plurality of first suction units, an image-capturing unit configured to capture an image of the object in a first direction, a distance measurement sensor configured to measure a distance to the object in a second direction crossing the first direction, a vertical frame, and a guide attached to the vertical frame and extending in the first direction, the program causing the computer to:

select a first object to be held based on an imaging result by the image-capturing unit;

calculate, based on a measurement result by the distance measurement sensor, a position of an upper surface of the first object crossing the first direction and a position of a side surface of the first object crossing the second direction; and cause the holding unit to hold the first object in accordance with the position of the upper surface and the position of the side surface, when the holding unit holds the first object and is moved in the first direction, the computer causes the distance measurement sensor to move in a direction opposite to the holding unit along the guide via an actuator while measuring a first distance from the first object by the distance measurement sensor, the program causing the computer to calculate a length of the first object in the first direction based on a measurement result of the first distance.

16. A handling apparatus comprising:

a holding unit including a plurality of first units configured to hold a first face of an object and a plurality of second units configured to hold a second face of the object;

an image-capturing unit configured to capture an image of the object in a first direction, wherein the first face crosses the first direction;

a distance measurement sensor configured to measure a distance between the object and the distance measurement sensor in a second direction crossing the first direction, wherein the second face crosses the first direction;

a vertical frame;

a guide attached to the vertical frame and extending in the first direction; and a control unit configured to select a first object to be held based on an imaging result by the image-capturing unit, calculate, based on a measurement result by the distance measurement sensor, positions of the first and second faces of the first object, and cause the holding unit to operate in accordance with the positions of the first and second faces of the first object, wherein the holding unit is configured to move in the first direction while holding both the first and second faces using the plurality of first units and the plurality of second units, wherein, when the holding unit moves in the first direction, the distance measurement sensor is moved in a direction opposite to that of the holding unit along the guide via an actuator while the distance measurement sensor measures a first distance from the first object, wherein the control unit is configured to calculate a length of the first object in the first direction based on a measurement result of the first distance.

17. The apparatus according to claim 16, wherein
the control unit moves the holding unit toward the first
object in the first direction at a first speed, moves the
holding unit in the first direction at a second speed
slower than the first speed, and then causes the holding
unit to hold the first object.

18. The apparatus according to claim 16, wherein
the control unit is configured to
acquire a movement amount of the holding unit for
each time during the movement of the holding unit in
the first direction,
acquire a movement amount of the distance measure-
ment sensor for each time during movement of the
distance measurement sensor in the first direction,
acquire a detection timing of an end portion of the first
object in the first direction by the distance measure-
ment sensor, and
calculate the length of the first object based on the
movement amount of the holding unit and the move-
ment amount of the distance measurement sensor at
the detection timing.

19. The apparatus according to claim 16, wherein
the distance measurement sensor is a laser range finder,
and
when the control unit moves the holding unit to a place-
ment location where the first object is placed, the
control unit adjusts a movement speed of the holding
unit in accordance with the measured length of the first
object.

20. The apparatus according to claim 16, wherein
the control unit moves the holding unit toward the place-
ment location at a third speed, moves the holding unit
at a fourth speed slower than the third speed, and then
causes the holding unit to place the first object at the
placement location.

21. The apparatus according to claim 1, wherein
the first direction is a vertical direction and the second
direction is a horizontal direction.

22. The apparatus according to claim 1, wherein
the distance measurement sensor is moved away from the
holding unit when the holding unit is moved in the first
direction.

* * * * *